(12) United States Patent
Fulmer et al.

(10) Patent No.: US 7,304,269 B2
(45) Date of Patent: Dec. 4, 2007

(54) PULSE WELDER AND METHOD OF USING SAME

(75) Inventors: Bruce E. Fulmer, Mentor, OH (US);
James E. Hearn, Brunswick, OH (US);
Christopher Hsu, Mentor, OH (US);
Steven R. Peters, Huntsburg, OH (US)

(73) Assignee: Lincoln Global, Inc., City of Industry, CA (US)

( * ) Notice: Subject to any disclaimer, the term of this patent is extended or adjusted under 35 U.S.C. 154(b) by 433 days.

(21) Appl. No.: 10/861,958

(22) Filed: Jun. 4, 2004

(65) Prior Publication Data

US 2005/0269306 A1  Dec. 8, 2005

(51) Int. Cl.
*B23K 9/09* (2006.01)
(52) U.S. Cl. ............................ 219/130.51; 219/130.21
(58) Field of Classification Search .......... 219/130.51, 219/130.21, 130.31, 130.32, 130.33
See application file for complete search history.

(56) References Cited

U.S. PATENT DOCUMENTS

| | | | |
|---|---|---|---|
| 3,683,149 A | | 8/1972 | Mages |
| 4,438,319 A | * | 3/1984 | Blot ....................... 219/130.51 |
| 4,717,807 A | | 1/1988 | Parks et al. |
| 4,835,360 A | | 5/1989 | Parks et al. |
| 4,866,247 A | | 9/1989 | Parks |
| 4,889,969 A | | 12/1989 | Kawai |
| 4,897,523 A | | 1/1990 | Parks et al. |
| 4,954,691 A | | 9/1990 | Parks et al. |
| 4,972,064 A | | 11/1990 | Stava |
| 5,001,326 A | | 3/1991 | Stava |
| 5,003,154 A | | 3/1991 | Parks et al. |
| 5,148,001 A | | 9/1992 | Stava et al. |
| 5,192,851 A | * | 3/1993 | James et al. ........... 219/130.51 |
| 5,278,390 A | | 1/1994 | Blankenship |
| 6,008,470 A | | 12/1999 | Zhang |
| 6,013,896 A | | 1/2000 | Zhang |
| 6,025,573 A | | 2/2000 | Stava |
| 6,051,810 A | | 4/2000 | Stava |
| 6,087,626 A | | 7/2000 | Hutchison |
| 6,204,478 B1 | | 3/2001 | Nicholson et al. |
| 6,215,100 B1 | | 4/2001 | Stava |
| 6,498,321 B1 | | 12/2002 | Fulmer |

(Continued)

FOREIGN PATENT DOCUMENTS

EP  0 324 960  7/1989

(Continued)

OTHER PUBLICATIONS

B. D. Deruntz, Assessing the Benefits of Surface Tension Transfer Welding to Industry, Journal of Industrial Technology, vol. 19, No. 4, Aug. 2003-Oct. 2003.

(Continued)

*Primary Examiner*—Clifford C. Shaw
(74) *Attorney, Agent, or Firm*—Fay Sharpe LLP

(57) ABSTRACT

An electric arc welder for performing a pulse welding process by a current between an advancing electrode and workpiece where the welder comprises a short detecting circuit for creating a short signal upon occurrence of a short circuit between the advancing electrode and the workpiece and a boost circuit to create a plasma boost pulse after the short circuit is cleared during the time period when the welder is not outputting the peak pulse current.

182 Claims, 17 Drawing Sheets

U.S. PATENT DOCUMENTS 6,617,549 B2 9/2003 Ihde
6,717,107 B1 4/2004 Hsu

FOREIGN PATENT DOCUMENTS

EP 1 232 825 A 8/2002
GB 2171267 A * 8/1986
JP 57-19165 A * 2/1982

OTHER PUBLICATIONS

Patents Abstracts of Japan, vol. 007, No. 126 (M-219), May 31, 1983 & JP 58 044964 A (Hitachi Seiko KK), Mar. 16, 1983 abstract; figures 1, 3-8.
European Search Report, EP 05 00 4410, Munich, Sep. 7, 2005, Concannon, B.

* cited by examiner

PULSE WELDER AND METHOD OF USING SAME

The present invention relates to a novel electric arc welder and more particularly to an electric arc welder for performing a novel pulse welding process and the method of pulse welding using the novel arc welder.

BACKGROUND OF INVENTION

In electric arc welding, one of the most popular welding process is pulse welding which primarily uses a solid wire electrode with an outer shielding gas. MIG welding utilizes spaced pulses which first melt the end of an advancing wire and then propel the molten metal from the end of the wire through the arc to the workpiece. Under ideal conditions, a globular mass of molten metal is melted and transferred during each pulse of the pulse welding process. An interruption in the normal operation of a pulse welding process occurs when the molten metal contacts the workpiece before being released from the advancing wire. Consequently, the high voltage pulse welding of over 25 volts is normally used so that the gap between the end of the electrode and the wire is relatively large. This limits the incidence of short circuits and the resulting spatter and puddle disturbance. It is advantageous to have a small gap or arc length less than about 0.20-0.30 inches. However, pulse welding usually requires a substantially higher voltage to assure proper transfer of the molten metal and to reduce short circuits. Nevertheless, the pulse welding process invariably involves a short circuit condition which must be eliminated rapidly to obtain the consistency associated with proper pulse welding. To remove short circuits, it is well known to increase the arc current immediately upon detection of the short circuit. The high arc current causes an electrical necking action to immediately separate the molten metal from the advancing electrode to again establish the arc. A discussion of this well known concept is contained in Ihde U.S. Pat. No. 6,617,549 incorporated by reference herein. Even with this well known short circuit clearance procedure, high voltage is still required for solid wire and the travel rate of the wire must be fairly low. When attempting to use cored wire for pulse welding, the arc voltage must be maintained fairly high, well above 25 volts, to avoid short circuit conditions that are not desired in a pulse welding process. In summary, short circuits cause reduced quality of the weld and reduce the traveling rate of the welding operation, as well as requiring high voltage with its disadvantages. These short circuits are more troublesome when attempting to use the metallurgical advantage of metal cored electrodes.

Short circuits in a pulse welding process affects arc stability, especially at lower voltages where the average arc length is less than about 0.20-0.30 inches. They also cause spatter during breaking of the short circuit. Consequently, pulse welding requires a procedure for clearing of inadvertent, random short circuits. This was done by merely increasing the arc current until the short circuit was cleared. Thus, the pulse welding process required high voltages, greater than 25 volts, to minimize inadvertent short circuits. This resulted in the need to operate at lower travel speeds. Furthermore, spatter and non-uniform weld beads resulted when high voltages and normal short circuit clearing was employed.

Pulse MIG welding primarily uses a solid wire electrode, metal cored wire, or flux cored wire typically shielded with an outer shielding gas. The power source creates a special pulsed output that alternates between a high output, sometimes called the "peak" and a lower output, called the "background." The peak output is greater than the welding electrode's spray transition current for a duration long enough to form and transfer one droplet of metal from the advancing electrode to the workpiece. Between pulses, the lower background output allows the electrode to advance toward the workpiece and be repositioned in order for the next peak to deposit the next droplet. Under ideal conditions, the pulsed output is maintained such that one droplet transfers from the electrode to the workpiece for each peak without allowing the droplet to bridge the gap causing a short circuit. This condition can be achieved when a sufficiently long arc length is maintained producing a relatively high average arc voltage. For example, pulse welding with a steel electrode running under 90% argon, 10% $CO_2$ is performed with an average voltage greater than about 26 volts.

In practice, there are many advantages when operating a welding process, such as pulse welding at shorter arc lengths. These advantages include lower heat input and better control of the puddle at higher travel speeds. At reduced arc lengths, partially transferred droplets are more apt to bridge the gap between the electrode and the work causing short circuits. As the arc length is reduced, shorting events become more frequent and become harder to clear. Modern pulse welding power sources, such as the POWER-WAVE by Lincoln Electric contain a technique to clear short circuits. When a short circuit is detected, the machine's output is increased in a controlled fashion until the short circuit is "pinched" off and the short is cleared. A discussion of this well-known concept is contained in Kawai U.S. Pat. No. 4,889,969, and in Ihde U.S. Pat. No. 6,617,549 incorporated by reference herein. Using this well-known technique, the welding process will remain stable even while occasional short circuits occur. This method allows users to reduce the arc length yet maintain stable operation at lower heat input levels. This improves the fast follow characteristics at higher travel speeds. For the previously cited example, the stable operation point is reduced to a voltage greater than about 23 volts. As the arc length is reduced below this point, shorting events occur quite frequently and may require a significant increase in pinch current in order to break shorts. When the short does break at high current, spatter typically occurs and an accompanying instability will follow as the high current pushes down on the puddle causing an oscillation. This problem is sometimes caused by repetitive shorting. As a short is cleared, another short immediately forms and is difficult to clear.

Cored wires are wires that are comprised of a metal sheath containing a core of metal power and/or slag producing compounds (FCAW-G) and/or compounds that produce shielding gases (FCAW-S). These wires are very advantageous to produce the desired metallurgy of the weld metal and to protect from contamination. Many of these cored wires can be used in a pulse welding process in a fashion similar to solid wires. However, in use of solid wires, these cored wires exhibit an increase in the frequency and severity of short circuits as the arc length is reduced. Indeed, the minimum arc length required for cored wires is higher than the minimum arc length or voltage for a solid wire since pulsing cored wires tends to melt the sheath leaving the core exposed allowing it to dip into the puddle. Thus, the advantage associated with cored electrodes can not be fully employed. There is a need for a pulse welder that can use cored electrodes with a reduced voltage without the problem of repeated short circuiting or where such shorts are cleared efficiently to eliminate their adverse impact.

THE PRESENT INVENTION

The present invention relates to an electric arc welding and method of using the same which performs a pulse welding procedure where a short arc length (less than 0.10 inches) or a low voltage of 17-22 volts can be used to control the puddle and prevent arc from skipping ahead of the puddle. Furthermore, the travel speed is increased with the use of a lower arc length and, thus, lower voltage without promoting shorting as previously described. The use of the present invention ensures that shorting occurs at low background current. This avoids spatter associated with a high current when entering a short and high current when exiting a short. The present invention ensures reliable separation of the wire tip and the puddle surface, even with small arc lengths. This enhances rhythm and stability in the high current pulse and in the low background current cycle. The invention is designed for high speed automatic welding of the type performed by a robot where a low voltage, short arc length is obtainable so that the travel speed can be increased. The invention improves low voltage welding at high speeds as it stabilizes the shortened arc length and thus reduces spatter. In accordance with the present invention, a short circuit in the pulse welding process is detected and cleared in accordance with standard technology; however, after the short circuit is cleared, a plasma boost pulse is created. This boost pulse is a high current pulse with power in the range of 5-20 KW and preferably in the range of 10-20 KW of regulated power. When using the invention for ferrous metal welding, the power of the plasma boost pulse is generally over 5 KW; however, when welding aluminum the plasma boost pulse can be reduced to 1.0-2.0 KW. Thus, the practical range is 1.0 KW to about 20 KW. This high current plasma boost pulse increases the output arc current at separation of the short circuit. This boost pulse increases the arc force to push the puddle away from the electrode, so that another short circuit does not occur during the same cycle. The plasma boost pulse heats the end of the electrode rounding the end of it to about the size of the wire diameter and an increase in arc force creates a separation between the wire and puddle so the electrode does not immediately short again. After the short has been cleared and the plasma boost has increased the arc force for a short period of time, generally in the range of 0.2-5.0 ms, the weld process is continued. The low background current of the pulse welding process allows the droplet to be pushed closer to the puddle before the next pulse transfers the formed droplet into the puddle. The invention involves the provision of a current, voltage or power pulse after the short circuit condition has been cleared using a standard short circuit clearing procedure used in many welders. This stabilizes the weld puddle and immediately allows resumption of the normal pulse welding process so that a high voltage and low speed is not required for the process. Even though the electric arc welder and method are designed basically for automated applications with high travel speed and low voltage, the invention is also used for semi-automatic applications where penetration must be reduced and is advantageous for cored wires, where high travel speed is required. It has also been applied to pulse welding using flux cored wire. The plasma boost pulse is similar to the STT peak current pulse in that it creates a droplet on the end of the electrode and forces the puddle from the electrode. The STT welding process has been pioneered by The Lincoln Electric Company and is disclosed in several patents, such as Parks U.S. Pat. No. 4,866,247, incorporated by reference herein as background information. The STT process has a waveform intentionally creating a short circuit. The use of a plasma boost pulse immediately after the clearance of a short circuit does not constitute a generated portion of the waveform constituting the actual pulse welding process. A short circuit is a random event that is not detrimental when using the present invention to control the puddle when the short circuit is cleared so the next short circuit will be later in the process. The plasma boost is created during an interrupt in the normal pulse welding process to stabilize the puddle, reduce spatter and increase welding speed, while allowing low voltage operation for both solid metal electrodes and cored electrodes. By using the invention, short circuits caused by the drastically reduced voltage (i.e. arc length) are not process disruptive. In practice, the welder is one using waveform technology pioneered by The Lincoln Electric Company of Cleveland, Ohio. The pulses and background current portions are formed by a high switching speed power source as small pulses created at a rate of over 18 kHz with a profile controlled by a waveform generator.

In accordance with a further aspect of the invention, the plasma boost pulse is preceded by a novel short circuit clearing process similar to the STT process. When a short circuit is detected, the arc current is reduced and then allowed to increase along a pinch pulse profile with a first abrupt slope and then a more gradual slope. A premonition circuit, normally a dv/dt detector is actuated when the short circuit is ready to "neck" or break. Then the arc current is dropped to a low level to reduce spatter. This terminates the short circuit and provides smooth surface tension transfer so the short circuit is really an excellent procedure for transferring metal to the workpiece. When there is an arc or plasma condition, the plasma boost pulse of the invention is outputted by the welder. This is a practical procedure for clearing the short circuit in a pulse welding process and is novel when in combination with the other advances of the present invention.

In accordance with the present invention, there is provided an electric arc welder for performing a pulse welding process by a voltage driven current between an advancing electrode and a workpiece. The current can be controlled by voltage or current regulation. The welder comprises a short detecting circuit creating a short signal upon occurrence of a short circuit between the advancing electrode and the workpiece and boost circuit to create a plasma boost pulse after the detection of a short circuit. In the preferred embodiment of the invention, there is a standard short circuit clearing circuit that increases the arc current after the short circuit signal and before the plasma boost pulse. This removes the short circuit before the plasma boost pulse. The plasma boost pulse has a regulated power in the general range of 1.0 KW to 20 KW and more particularly in the range of 10-15 KW. The plasma boost pulse has a duration in the general range of 0.2-5.0 ms. The invention is quite useful when welding with a cored wire electrode, such as metal cored and flux cored wire electrodes.

In accordance with another aspect of the present invention, the plasma boost pulse occurs during an interrupt in the normal waveform generator that creates the waveforms constituting a pulse welding process.

In accordance with yet another aspect of the invention, the boost circuit for creating the plasma boost pulse of the pulse welding process also includes the creation of a controlled background current following the plasma boost pulse. This background current is normally different from the background current of the pulse waveform and continues until the next generated pulse in the pulse welding process. The end of the generated background segment resets the timer to initiate the standard pulse wave process. The background segment is adjustable in some instances by a voltage feedback from the output arc voltage of the welding process. The arc voltage created during a specific plasma boost pulse controls the background segment following that specific plasma boost pulse.

In accordance with another aspect of the invention there is provided a method of pulse welding by a series of pulses between an advancing electrode and a workpiece. The method comprises detecting a short circuit between the electrode and the workpiece and then creating a plasma boost pulse after the short circuit. In accordance with the preferred embodiment, the plasma boost pulse occurs after the short circuit has been cleared in accordance with standard technology.

In accordance with still another aspect of the present invention, a plasma boost pulse having a defined shape or profile (with a high current pulse and a background segment) is incorporated as part of the actual welding process so that a plasma boost pulse of a desired shape is created between the standard pulses of the pulse welding process. In this manner, a plasma boost pulse preheats the end of the electrode and creates a droplet for the next pulse that transfers the droplet to the puddle. This can be used in a GMAW-pulse welding process using non-ferrous metals, such as nickel alloy or titanium alloys. Cored wires including metal cored wire, such as FCAW-G and FCAW-S wires, can be used with this welding process. The use of a plasma boost pulse between each of the high current pulses in the weld process causes a high arc force pushing the puddle away during melting of the end of the electrode advancing toward the workpiece. This gives a hesitation time to allow melting of the electrode without transferring the molten metal to the workpiece until the next pulse in the process is created. This aspect of the invention can be modified so the sensed voltage of the pulse is used to adaptively adjust the background portion of the inserted waveform.

The present invention relates to an electric arc welding and method of using the same, which performs a pulse welding procedure where a short arc length (less than about 23 to 25 volts) is desirable to reduce the heat input and to improve fast follow characteristics at increased travel speeds. The use of the present invention in cooperation with conventional pulse MIG technology promotes arc stability when operating at short arc lengths and low voltages. It also ensures reliable, consistent separation of the welding electrode and puddle surface after a short circuit has been cleared. This procedure enhances rhythm and stability throughout a wide range of operating procedures. The invention was developed for high-speed automatic welding of the type performed by a robot where low voltage and, thus, a short arc length is desirable to improve welding performance at increased travel speeds. However, the invention is used for sem-automatic applications where reduced heat input is desirable. Pulse waveforms using this invention can be adjusted for longer arc lengths and will perform similarly to conventional pulse technologies. But, the real advantage is obtained by using low voltage where short circuits are more numerous.

This invention improves welding at high travel speeds by improving stability at low voltages. In accordance with the present invention, a short circuit is detected and cleared in accordance with standard technology; however, after the short circuit is cleared, a plasma boost pulse is created. A plasma boost pulse can be described as pulsing the output to a defined amplitude of a defined duration. A plasma boost pulse can be defined as an output current voltage, power or volt/ampere slope level with the preferred implementation using a power level. This plasma boost is defined as a power level from 1.0 KW to 20 KW continuing for 0.2 to 5 ms. In practice, the plasma boost pulse is set for 10 to 15 KW with a duration of 0.2 to 0.5 ms. The concept of a plasma boost pulse is an energy based upon a power level maintained for a time. The manner of obtaining this pulse can be varied. This high current plasma serves to increase the arc force just after the separation of a short circuit. The increase in arc force created by the boost pulse pushes the puddle away from the electrode, so that another short circuit does not occur during the same cycle. The plasma boost pulse heats the end of the electrode to create a molten metal droplet that will become the next droplet to be transferred by the subsequent pulse of the pulse welding process. After the short has been cleared and the plasma boost has increased the arc force and heated the end of the electrode, the normal pulse weld process is continued. The remaining low background current of the pulse welding process allows the droplet to be pushed closer to the puddle before the next pulse transfers the formed droplet into the puddle. This invention involves the provision for a current, voltage or power plasma boost pulse after the short circuit condition has been cleared using a standard short circuit clearing procedure. This stabilizes the weld puddle and allows immediate resumption of the normal pulse welding process so that steady operation is possible even at low voltages.

The invention is also used for semi-automatic applications where penetration must be reduced and is substantially advantageous for metal cored wires where high travel speed is required. It has also been applied to pulse welding using flux cored wires. When metal cored wire is used, it has been determined that an effective amount of sulfur in the core improves the operation of the invention especially when using metal cored wire. In practice the sulfur is in the range of 0.010-0.030 percent by weight of the wire, and preferably 0.012 to 0.023 percent by weight of the wire.

An advantage of the invention is that parameters of the pulse welding process can be set such as to actually promote shorting events. In such process, the transition to peak is fast to quickly start the formation of a droplet. The pulse peak time is reduced so that the droplet does not detach fully from the electrode during the peak current. The transfer of arc current to background is fast to quickly reduce the arc force on the puddle to allow it to rise and advance toward the droplet. The output current is forced below the actual background level to further promote the droplet to bridge between the electrode and the workpiece. The frequency is kept high to keep the droplet size small. When a droplet does bridge from the electrode to the puddle, the shorting response clears the short, and the plasma boost creates the next droplet on the end of the wire and forces the puddle away from the electrode.

By a plasma boost pulse between each pulse of the pulse welding process a rhythm is established that has the weld puddle moving to facilitate smooth pulses with intermediate plasma boost pulses. This allows lower spatter than obtained in a conventional pulse welding process where increased voltages cause lower spatter. The relationship of voltage and spatter by use of the present invention is shifted downwardly from the conventional relationship or operating curve of voltage/spatter. At any voltage, spatter is lower using the invention.

Because of the stability of the plasma boost, the process can be run at levels where every droplet is transferred through a short circuit, thereby significantly reducing the heat input of the welding process. The ability to transfer metal across a short circuit infers that the electrode, i.e. solid wire, metal cored wire, or flux cored wire, is stable in a short circuit transfer mode. Such as the case with many steel, stainless, aluminum solid wires, the present invention can improve the welding performance at shorter arc lengths. Metal cored wires with a stable short arc performance such as Lincoln Electric's MS-6 ad MC-706 wire can benefit from the present invention. Utilizing the present invention, these wires have the improved ability to handle poor fit up conditions and faster travel speeds. These wires include an effective amount of sulfur to cause the wire to operate uniformly during short circuit transfer of metal.

The invention is a refined pulse welding process designed specifically to allow faster speeds than standard pulse waveforms. It improves low voltage welding at high speeds, as it stabilizes the process with shortened arc length. With conventional waveforms, the arc length is kept longer to avoid spatter, thus limiting travel speed. In the invention, the arc length is kept short and tight and spatter is avoided with control of the short circuit cycle. Thus, the shorter arc is stabilized with rhythmic short circuit cycles. The treatment of the short circuit reduces stubbing and spatter.

The primary object of the present invention is the provision of an electric arc welder, which welder utilizes a plasma boost pulse after a short circuit has been cleared and before the next adjacent pulse for melting and transferring molten metal to the weld puddle.

Another object of the present invention is the provision of an electric arc welder, as defined above, which welder can be operated at high speed, with a short arc length and/or with metal cored of flux cored wires. When using metal cored electrodes, the core has an effective amount of sulfur to improve the shape of the weld bead at high travel speeds.

Still a further object of the present invention is the provision of an electric arc welder, as defined above, which welder is primarily useful for automatic welding in a robot and other mechanized welding mechanisms by a high travel speed, low voltage and low spatter.

Yet another object of the present invention is the provision of a method of pulse welding wherein an inadvertent short is cleared and then followed by a plasma boost pulse having a high power, such as about 1-5 KW to 20 KW for a short time such as about 0.1-5.0 ms, preferably less than 1.0 ms.

Yet a further object of the invention is the provision of an electric arc welder and method which can operate at low voltage and converts the short circuits of such a process to an advantageous metal transfer technique.

Still a further object of the invention is the provision of an electric arc welder for pulse welding and a method for operating said welder, which welder and method provide faster travel speed, shorter cycle time, higher yield per time and increased productivity for automatic pulse welding, especially with a robot.

Yet a further object of the invention is provision of a welder and method, as defined above, which welder and method performs fast welding on steel, such as plates in the range of 1.5 to 4.0 mm in thickness, without the risk of weld skips, undercuts or high spatter levels. The welder and method provide excellent arc stability at lower arc voltage (shorter arc length) with reduced spatter and washed out bead profile to thereby increase travel speed.

These and other objects and advantages will become apparent from the following description taken together with the accompanying drawings.

PREFERRED EMBODIMENT

Figure 1:
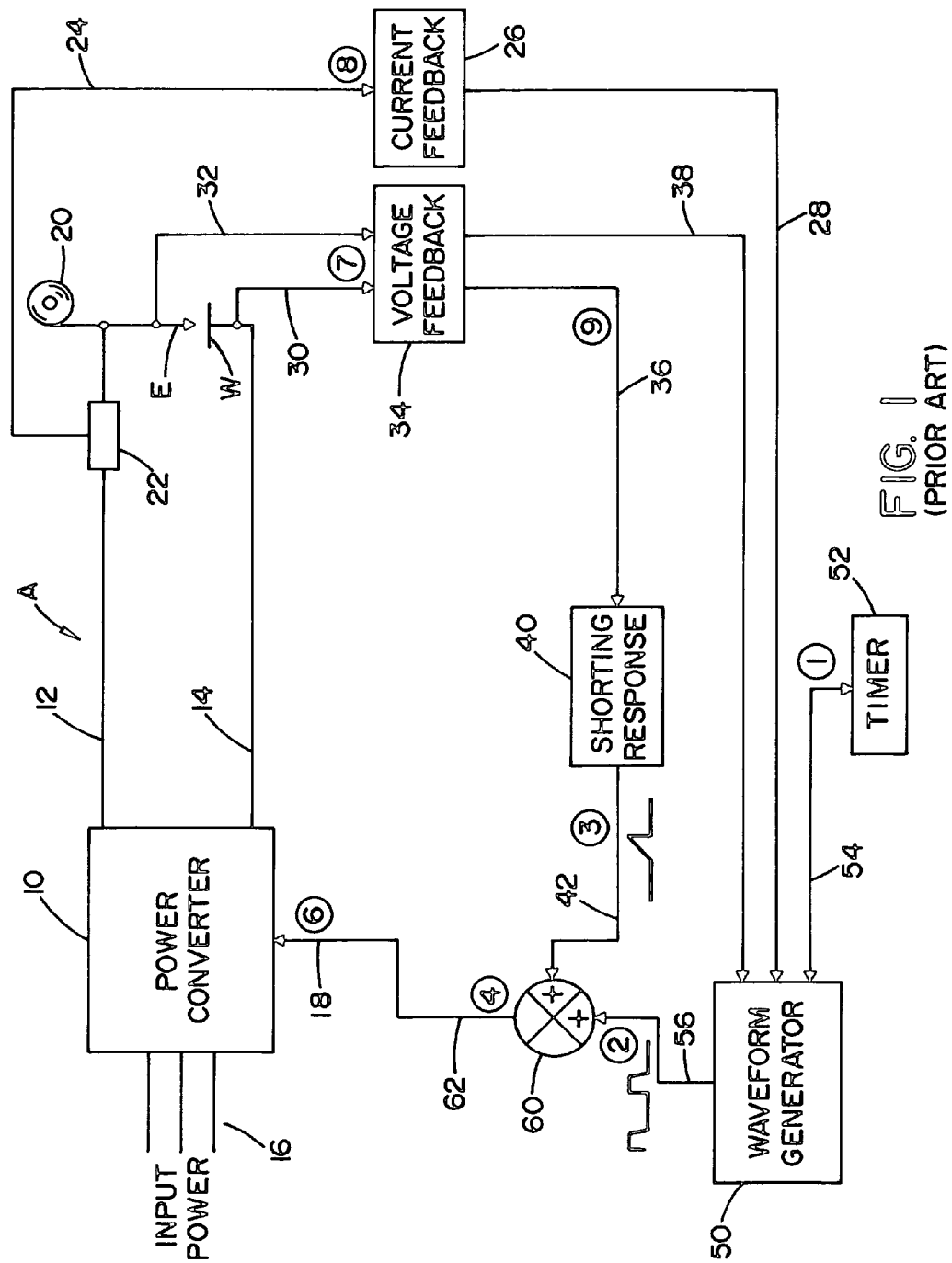
FIG. 1 is a combined block diagram and wiring diagram illustrating an electric arc welder for performing a pulse welding process in accordance with the prior art.
Figure 2:
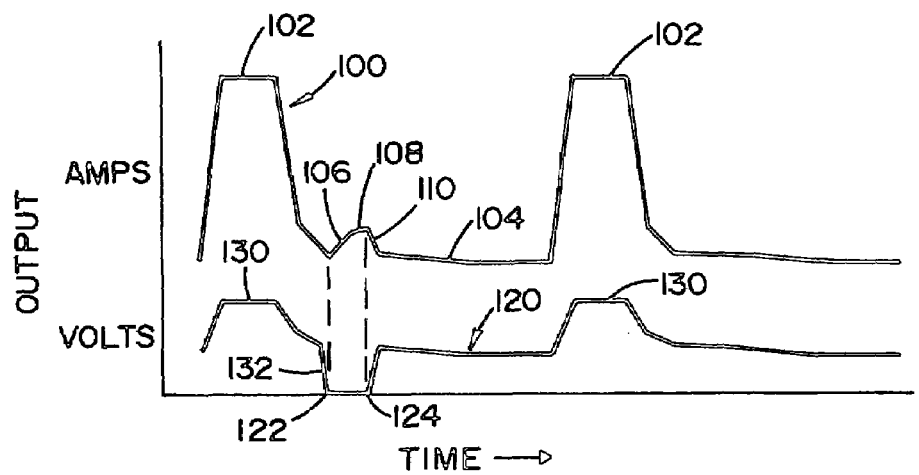
FIG. 2 is a graph illustrating a voltage curve and current curve of a prior art pulse welding process.
Figure 3:
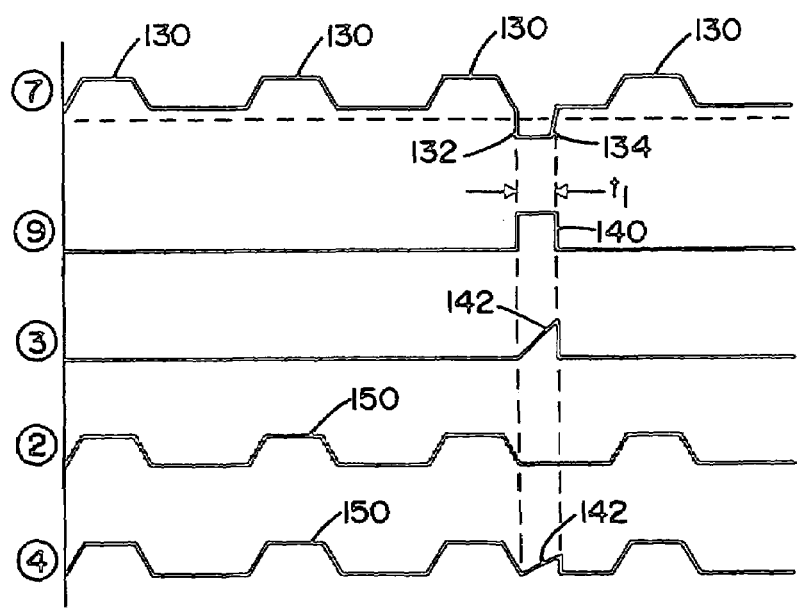
FIG. 3 is a graph illustrating the signals of various locations in the electric arc welder illustrated in FIG. 1.

Referring now to the drawings, wherein the showings are for the purpose of illustrating a preferred embodiment of the invention only and not for the purpose of limiting same, FIGS. 1-3 illustrate a prior art electric arc welder A for performing a pulse welding process, as shown in FIG. 2. The prior art is illustrated since the components used in practicing the invention are essentially the same as standard components in electric arc welder. Although other welder architecture could be used, the preferred architecture is a welder controlled by waveform technology as pioneered by The Lincoln Electric Company of Cleveland, Ohio. Two of many patents relating to waveform technology is described in Blankenship U.S. Pat. No. 5,278,390 and Fulmer U.S. Pat. No. 6,498,321, incorporated by reference herein as background information. In this type of welder, a waveform generator produces the profile for the waveforms used in a pulse welding process. The power source creates the pulses in accordance with the shape determined from the waveform generator by using a plurality of current pulses and at high frequency such as over 18 kHZ. This type of technology produces precise pulse shapes for any desired welding process. Even though the invention will be described with respect to the use of a welder employing waveform technology, the invention is broader and may be used in other welders, such as SCR controlled welders and chopper based welders.

Electric arc welder A shown in FIG. 1 is used to perform a standard pulse welding process as illustrated by the curves in FIG. 2 with a plurality of operating signals indicated at various locations in FIG. 1 and by corresponding numbers in FIG. 3. Before addressing the preferred embodiment of the invention, background of the invention as it relates to the prior art shown in FIGS. 1-3 will be considered. Electric arc welder A has a power source 10 in the form of a high speed switching inverter with output leads 12, 14 for creating the pulse welding process between electrode E and workpiece W. Power source 10 is driven by an appropriate power supply 16, illustrated as a three phase input. The profile of the pulses and separating background current constituting the pulse welding process is determined by a signal on wave shape input 18, in accordance with standard technology. Current shunt 22 communicates the arc current of the welding process by lines 24 to a current sensor 26 having an analog output 28 used for a feedback control loop. In a like manner, leads 30, 32 communicate the arc voltage to voltage sensor 34 having a detect output 36 and a level or amplitude output 38. The detect output indicates when the level of voltage plunges during a short circuit between electrode E and workpiece W. Level output 38 has a signal representative of the arc voltage across the electrode and workpiece. Voltage detect output 36 is directed to a shorting response circuit 40 having an output 42 which outputs a signal 3, as shown in FIG. 3. When there is a short circuit, there is a detect signal in line 42 in accordance with standard technology. Waveform generator 50 is loaded with the particular waveform to perform the welding process. This waveform is indicated as signal 2, shown in FIG. 3. Timer 52 directs a timing signal by lines 54 to waveform generator for the purpose of initiating the individual pulses constituting the welding process. Generator 50 also has feedback signals from lines 28, 38 to control the voltage and current in accordance with the set profile of the waveform generator and the existing profile between the electrode and workpiece. The waveform that is to be outputted by power source 10 is signal 2 in line 56. This signal is connected to the input of summing junction or adder 60 having an output 62 for signal 4. This signal, in the prior art welder A, is the actual signal directed to input 18 of power source 10. The welding process performed by welder A is illustrated in FIG. 2 wherein current curve 100 has a series of spaced current pulses 102 separated by background current portion 104. Voltage curve 120 is the voltage between lines 30, 32 and constitutes the arc voltage correlated with the arc current of curve 100. The peak voltage is a result of applying peak current 102. A low average voltage of curve 120 is due to a high instantaneous arc voltage average with a shorting or below about 6.0 volts. When there is a short circuit, arc voltage 120 plunges as indicated by point 122. This voltage plunge indicates a short circuit of molten metal between the electrode and workpiece. When that occurs, a clearing procedure overrides the waveform shape in line 56. Upon detection of a short circuit at point 122, a high current is applied between the electrode and workpiece along ramp 106 shown in FIG. 2. In practice, this ramp is steep and then become gradual as indicated by portion 108. When the short circuit is cleared by the increased current, in accordance with standard technology, the voltage of curve 120 immediately shifts back to a plasma or arc condition. This causes a tail out or recovery of the current along line 110. Consequently, when there is a short circuit, arc current is increased along ramp 106 and ramp 108 until the short is cleared, as indicated by an increased voltage. This removal of the short circuit, stops the output of shortening response circuit 40. The operation of welder A is disclosed by the signals 2, 3, 4, 7 and 9 as shown in FIG. 3. Signal 7 is the sensed voltage in line 36. Under normal circumstances, voltage 120 includes a plurality of spaced pulses 130 having shapes determined by waveform generator 50 and spacing determined by timer 52. When there is a short at point 122, the voltage plunges along line 132. This causes a pulse 140 that generates an output in line 42 which output is in the form of signal 142 generally matching ramp 106 for the current curve 100 that is added to signal 2. The output of waveform generator 50 is signal 2 constituting the waveform signal 150 shown in FIG. 3. The output of summing junction 60 in line 62 is the summation of signals 2 and 3 which is shown as signal 4 in line 62. Ramp 142 is added to waveform 150 so that the output between electrode E and workpiece W is the signal in line 18 controlling the inverter type power source 10. This is a representation of a standard prior art welder which is modified by the present invention to provide rapid movement of the electrode with a reduced arc length and reduced spatter.

Figure 4:
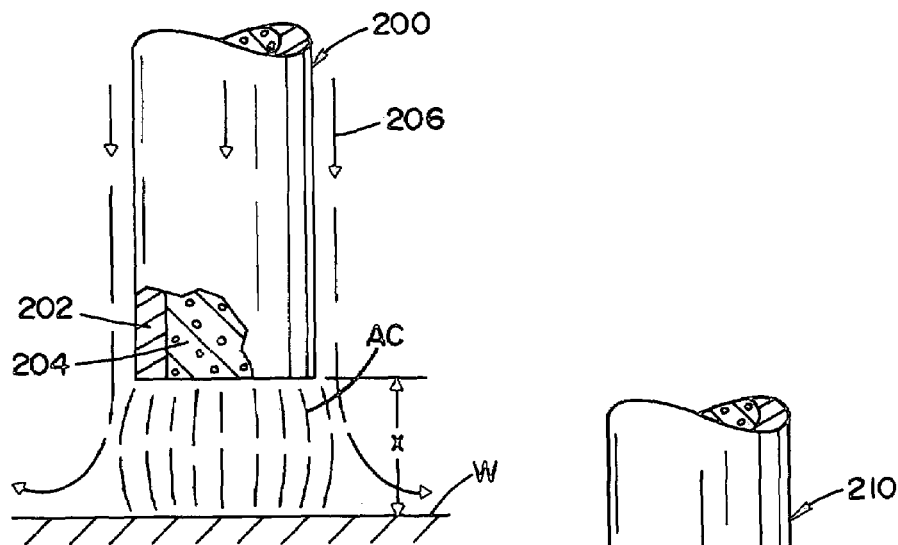
FIG. 4 is an enlarged partially cross-sectioned view of an electrode with a core and an external shielding gas used in the present invention.
Figure 5:
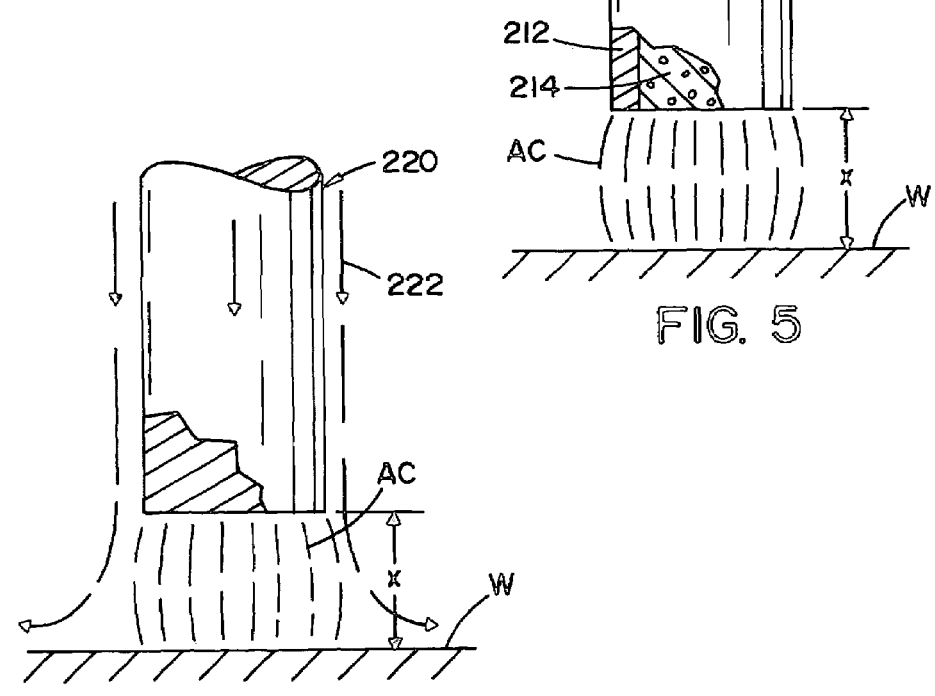
FIG. 5 is a view, similar to FIG. 4, illustrating a flux cored electrode with a self shielding core and useable in the present invention.
Figure 6:
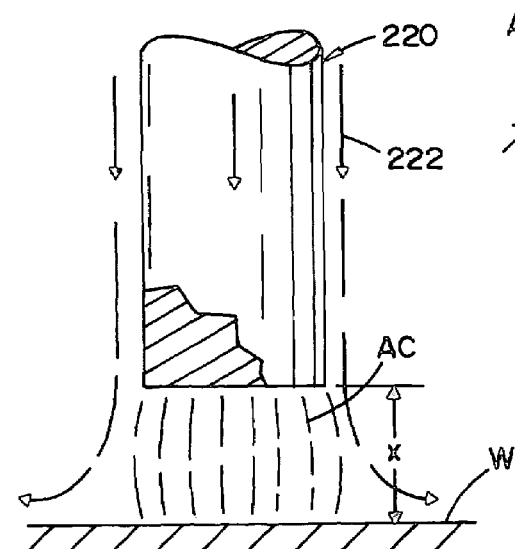
FIG. 6 is a view, similar to FIGS. 4 and 5, showing a solid wire electrode with an external shielding gas as normally used in the prior art electric arc welder of FIG. 1.

By using the present invention, the pulse welding process can be shifted from a high voltage process with an arc voltage, in a range greater than 26-27 volts, to a low voltage process where the arc voltage is less than 25 volts and specifically in the general range of 17-22 volts. With this low voltage made possible by using the present invention, the arc is stable with a very short arc length below about 0.20-0.30. At about 22 volts and 200 amperes the arc length is about 0.15 inches steel wire with 90% argon and 10% $CO_2$. This allows a faster travel rate while still maintaining a good bead profile. Other wires can be used, such as aluminum or stainless steel. Three different electrodes used in the invention are illustrated in FIGS. 4-6. In FIG. 4, cored electrode 200 is advanced in the direction of the arrow and includes an outer steel sheath 202 and an inner core 204 formed from alloy agents and other compounds necessary for providing the desired weld metal in the weld bead. As an arc or plasma AC is created between the electrode and workpiece W, shielding gas 206 is directed around the arc to protect the arc from atmospheric contaminants. The arc length x is a length less than 0.30 inches and is created by voltage in the general range of 17-22 volts. This type of electrode is well suited for use in the present invention. Another cored electrode is shown in FIG. 5, where electrode 210 has an outer sheath 212 and an inner core 214. This electrode is a self-shielding electrode where the composition of core 214 provides fluxing agents and other compositions to protect the molten metal as it is transferred through the arc and onto the workpiece W. Again, this cored electrode is useful in practicing the invention wherein cored electrodes in the past have not been successfully employed for pulse welding. FIG. 6 shows solid wire electrode 220 with shielding gas 222. This is the normal wire heretofore used in pulse welding. This type electrode is the electrode normally used in MIG welding and particularly in pulse welding. By using the present invention, electrodes 200, 210 and 220 can now be used in pulse welding. Thus, the invention takes advantage of metallurgical and physical attributes of cored electrodes in pulse welding. The advantages of a cored electrode for STT welding is discussed in Stava U.S. Pat. No. 6,071,810 incorporated by reference herein as background information. Cored electrodes can be used because the invention provides low voltage so the voltage range for the welding process by cored electrodes is extended. When using solid wire as illustrated in FIG. 6, the low voltage of the invention allows the wire to travel faster. By using the present invention, all of the electrodes shown in FIGS. 4-6 can be used according to the demands of the welding process. In the past high arc voltages prevented effective uses of all types of electrodes. Since the present invention allows very low arc voltage, the arc length is small and the molten metal often transfers to the workpiece by a short circuit. This process makes use of cored electrodes, especially metal cored electrodes, very acceptable for pulse welding. Indeed, a metal cored electrode with about 0.010 to 0.030 sulfur in the core have been proven extremely effective when obtaining the general advantage of the plasma boost pulse concept of the present invention. Wire electrodes, Metal Shield MC6 and MC 706 sold by The Lincoln Electric Company of Cleveland, Ohio have proven to be advantageous for use with a method using a plasma boost pulse where the shielding gas 75-95% argon with the balance $CO_2$ gas. These wires conform to the E70C-6M designation. Other metal cored electrodes and self shielding cored electrodes have taken advantage of the low voltage, low arc length obtainable in a process performed in accordance with the present invention.

Figure 7:
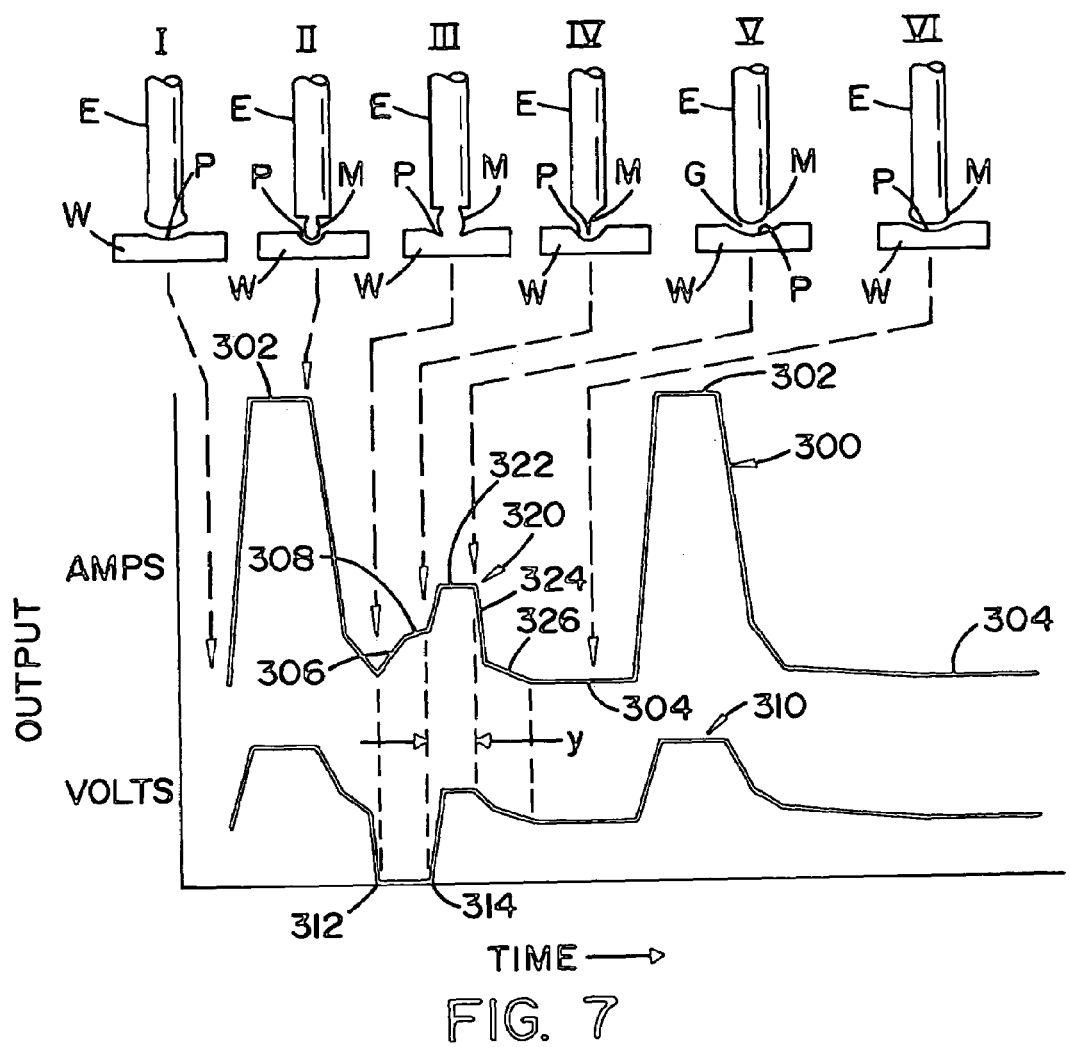
FIG. 7 is a graph with a voltage curve and a current curve illustrating the pulse welding process in accordance with the preferred embodiment of the present invention and containing pictorial representations of electrode and workpiece at various stages in the welding process.
Figure 8:
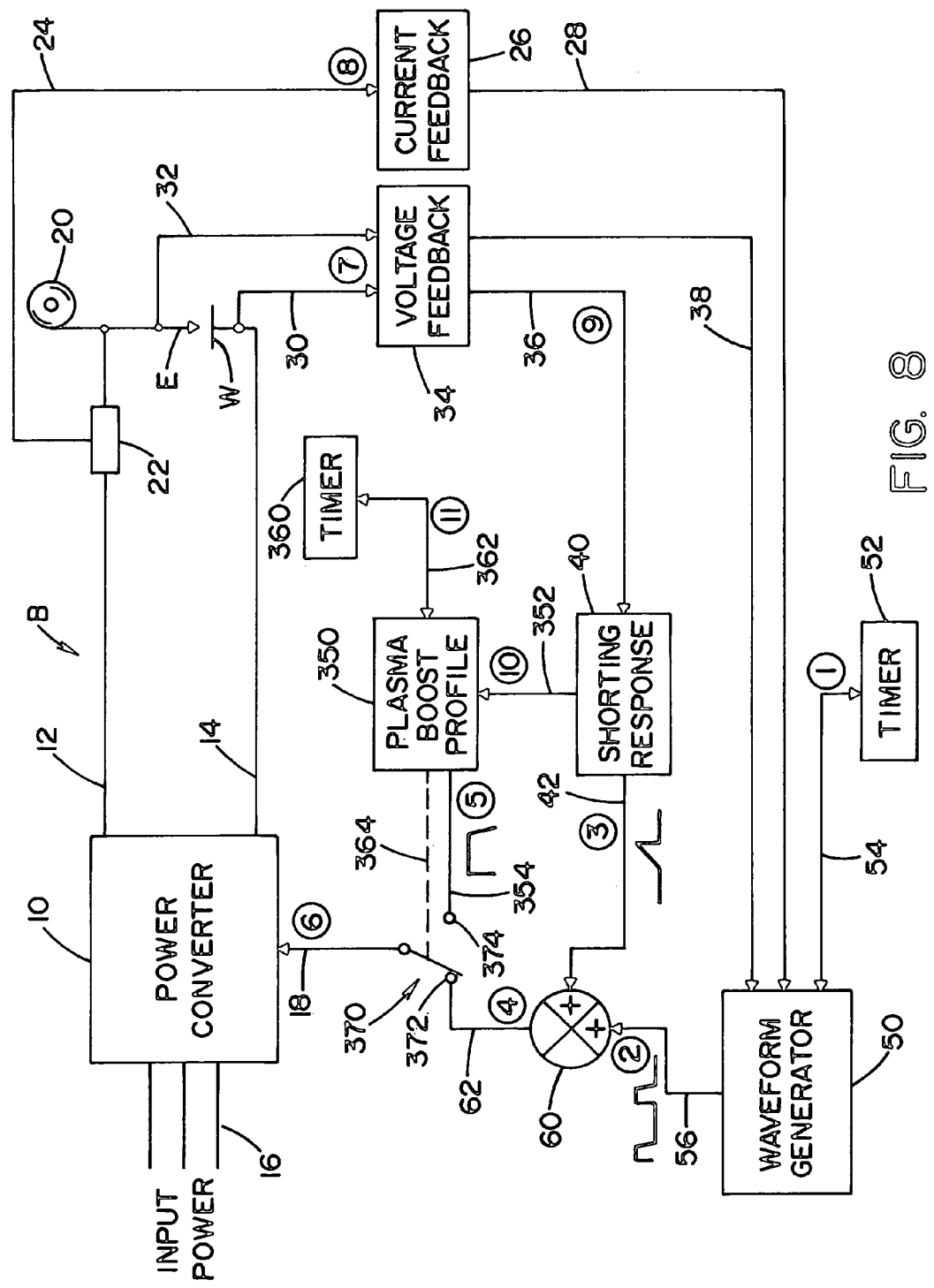
FIG. 8 is a combined block diagram and wiring diagram showing an electric arc welder for performing the pulse welding process illustrated in FIG. 7.
Figure 9:
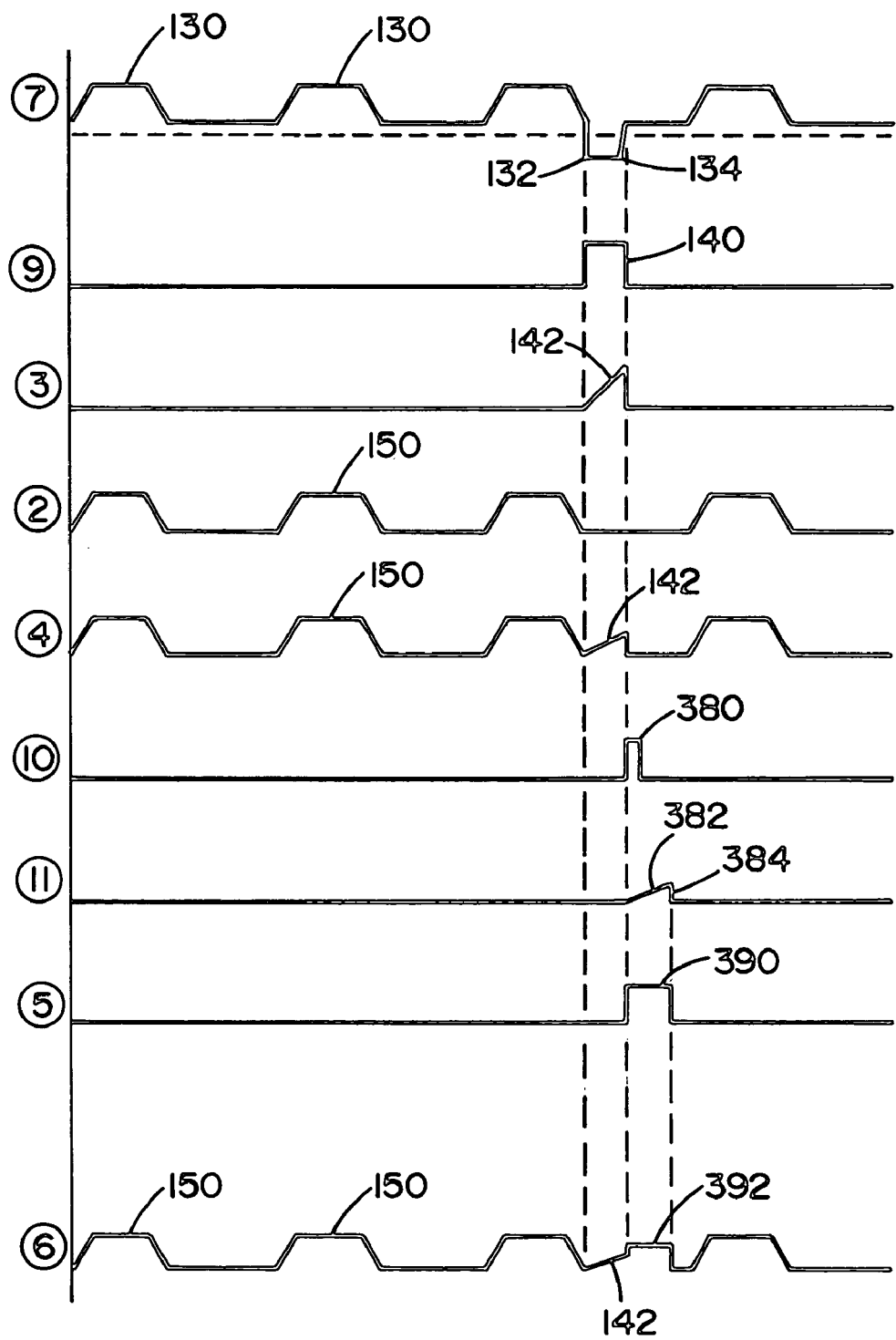
FIG. 9 is a graph showing the signals at various locations in the electric arc welder shown in FIG. 8.

The preferred embodiment of the invention is illustrated in FIGS. 7-9 that produces the pulse welding method best shown in FIG. 7. Current curve 300 includes spaced pulses 302 separated by background portions 304 determined by the output of waveform generator 50 with the pulses spaced by the output of timer 52. Of course, timing can be built into the program of the waveform generator. Background current 304 is provided between pulses 302 for use in keeping the arc lit after molten metal M has been formed and deposited onto the workpiece in the molten metal weld puddle. Voltage curve 310 includes a short circuit detect point 312 and a short circuit clear point 314. Curve 300 shows the normal high current clearing routine to generate portions 306, 308 corresponding to portions 106 and 108, respectively, of the prior art shown in FIG. 2. The invention involves the provision of a plasma boost pulse 320 preferably after the short circuit clear point 314 so the boost pulse occurs during an arc condition or a plasma condition. In practice, this plasma pulse is created during an interrupt of the output from waveform generator 50 and is substituted for the output of the generator at input 18 of power source 10. Plasma boost pulse 320 is a regulated power in the general range of 5-20 KW and preferably less than about 10-15 KW. For aluminum, the power may be as low as 1.0 KW. This pulse has a peak portion 322 that has a time distance y which is generally less than 5.0 ms and preferably in the range of 0.2-5.0 ms. In the present implementation, the time is 0.3 ms. Pulse 320 is terminated at the end of the peak portion 322 to enter a current reduction section where the arc current falls to background current level 304. In the preferred embodiment, this reduction in current is a long trailing edge 324 and a generally gradual tail out portion 326 so the plasma boost pulse is terminated before 5.0 ms. The operation of the plasma boost is depicted in the pictorial representations I-VI at the top of FIG. 7. Electrode E advances toward workpiece W while molten metal M is forming as shown at position I. The current between the electrode and workpiece is then increased to peak of pulse 302 causing the end of electrode E to melt further and produce a molten metal ball M. The operation of peak 302 is at position II. Workpiece W involves a molten metal puddle P which is cavitated by the arc force between electrode E and workpiece W. After position II, in normal pulse welding, the molten metal M at the end of electrode E is transferred through the arc to the puddle P during the background portion 304 of the process. Then the process is repeated as shown in position VI. A short circuit between electrode E and puddle P by molten metal M is not formed as a part of a normal pulse welding operation. When a short circuit occurs as shown at position III, the arc voltage is plunged at point 312. The short circuit then initiates a high current clearing routine or sequence represented by portions 306, 308 to neck off and separate molten metal M from electrode E as shown in position IV. Then the present invention is implemented. At the clearance of the short circuit represented by a rapid rise in voltage at point 314 a plasma boost pulse is outputted. The plasma boost pulse force puddle P away from electrode E as shown at position V. This high arc force cavitates puddle P drastically to assure a separation between molten metal M and molten puddle P. This assures that there is no incipient short or short circuit until after the next pulse 302. After pulse 320 shown at position V, the low background current portion 304 is implemented by waveform generator 50. This allows the puddle P of workpiece W to become quiescent so that the cavitation is decreased in a manner illustrated at position VI. By using the present invention as shown in position V, a substantially larger spacing or gap G is provided between the end of electrode E and puddle P of workpiece W. This large gap is the result of the plasma boost pulse following the necking and rupture of the short circuit. The present invention allows lower voltages, faster operation and uniform weld beads with low spatter. Creation of the arc forced gap controls the shape of the molten metal in the puddle directly under the electrode as the short circuit has been cleared. Position V represents a primary advantage obtained by using a plasma boost pulse following a short circuit in a pulse welding operation. It is possible to use only plasma boost pulse to both clear a short circuit, as well as force the puddle into a large arc force cavitation shown in position V. However, this can increase spatter. So clearing of the short circuit is preferred. Since the short circuit is cleared and followed by a high power plasma boost pulse, the short circuit event is no longer disruptive of the pulse welding process. As will be shown later, the existence of periodic short circuits may be beneficial and are surely rendered less detrimental.

The pulse welding process with a plasma boost pulse is performed by electric arc welder B shown in FIG. 8. The same functional components as used in welder A, shown in FIG. 1, with the same number and same signals are used in welder B. To practice the invention, welder B is provided with a plasma boost profile circuit 350 having a start interrupt signal in line 352 with the short circuit is cleared at point 314 in FIG. 7. A signal in line 352 when the point 314 is reached is communicated to timer 360 by line 362. This starts timer to create an interrupt time. This interrupt signal in line 362 continues until timer proceeds to its set time. The signal in line 362 from timer 360 sets the duration of the interrupt during which the plasma boost profile circuit 350 is operated. Output 354 processes the boost pulse profile during the interrupt when the interrupt signal in line 364 shifts switch 370 from the normal contact 372 and the interrupt contact 374. When timer 360 holds switch 370 in the interrupt position at 5 contact 374 plasma boost circuit 350 outputs a profile signal in line 354 so long as timer 360 is timing to give a signal in line 364. This profile is the plasma boost pulse 320 shown in FIG. 7. Of course, switch 370 is a digital software switch to shift from the output 62 of summing junction 60 to the interrupt position while circuit 350 processes a profile indicated as signal 5. This signal is directed to input 18 of power source 10. The various signals are shown in FIG. 9 with the numbers corresponding to the signals in FIG. 3. The new signals 5, 6, 10 and 11 are shown in the lower portion of FIG. 9 and are coordinated in time with the other signals previously described. When the short circuit has been cleared, shorting response circuit 40 creates signal 10 in line 352, which signal is a pulse 380. This pulse starts the timing signal 11 which is a ramp signal 382 having a time out position 384. As long as timer 360 is timing, an interrupt signal 390 is maintained while the plasma boost profile in line 354 is processed by power source 10. During the interrupt and signal output indicated by pulse 390, the control voltage on input line 18 is in the form of pulse 392 shown as signal 6. In practice, it is beneficial when the short circuit is formed (point 312 of FIG. 7) at a low current which will minimize any spatter created. Since the cross section of the short circuit is minimal, only a minimal increase in current by the shorting ramp is required to clear the short circuit. The short clears at a relatively low current resulting in minimal spatter created by the release of the short.

By using the present invention as shown in FIGS. 7-9, a plasma boost is provided after the normal short circuit clearing routine has been performed by shorting response circuit 40 in accordance with standard practice. In accordance with a broad aspect of the invention, the plasma boost pulse can replace the short clearing routine; however, this is not a preferred implementation of the present invention. The standard pulse program from waveform generator 50 can be modified to improve the shorting events and improve the response to the short circuits so the events are not disruptive. These modifications include a fast transition from the low background current to the high peak current at the leading edge of pulse 302. This quickly increases the output to a level above the transition current to start melting of a droplet on the end of the electrode. Then, a fast transition from the high peak current of pulse 302 to the low background current 304 can be provided. This quickly reduces the arc force between the droplet and the puddle. As this arc force is removed, the puddle and droplet can short easily. The transition from the peak current to the background current 302 will short more often and positively if the initial transition overshoots the background current slightly. Thus, the trailing edge of pulse 302 transitions to a current slightly below the background current 304. This aspect of the invention is disclosed in more detail later when discussing FIG. 22. As illustrated in FIG. 7, the shorting response is a multi-ramp response that minimizes the initial response to the short circuit for separating incipient shorts and then increases the current response for clearing harder shorting events. This method has been used for many years in the Power Wave 455 manufactured by The Lincoln Electric Company when processing standard CV programs.

Figure 10:
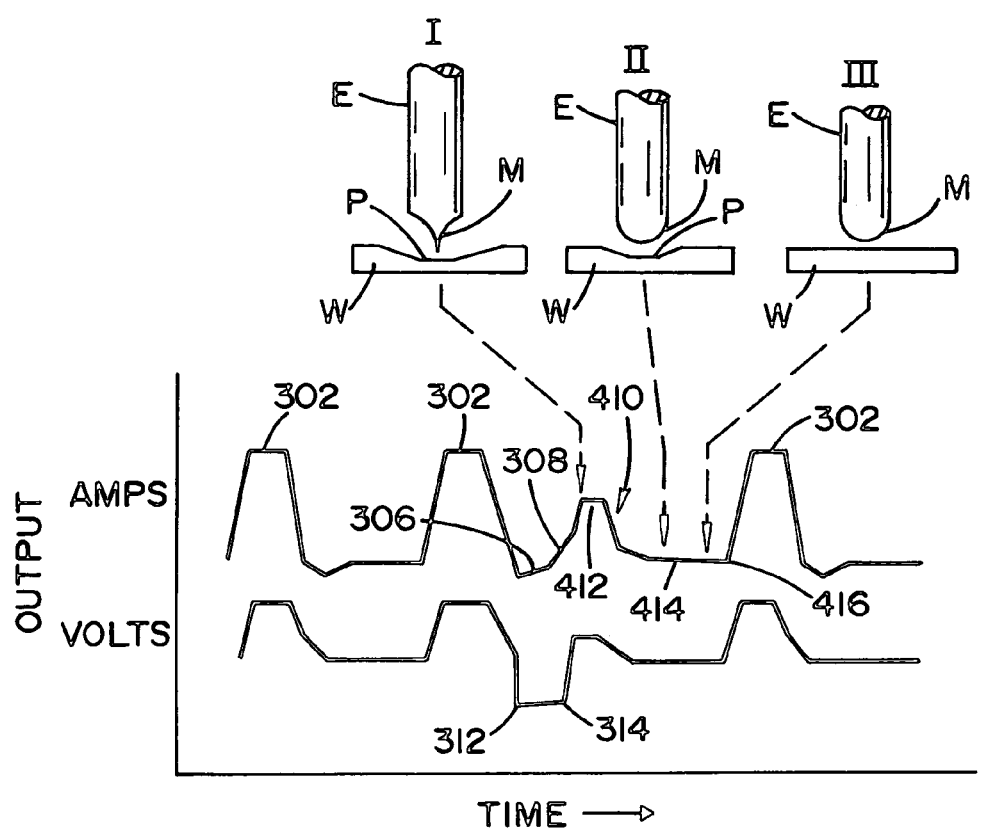
FIG. 10 is a graph containing a voltage curve and current curve of a pulse welding process including an addition to the preferred embodiment of the present invention with pictorial representations of various stages performed by this addition.
Figure 11:
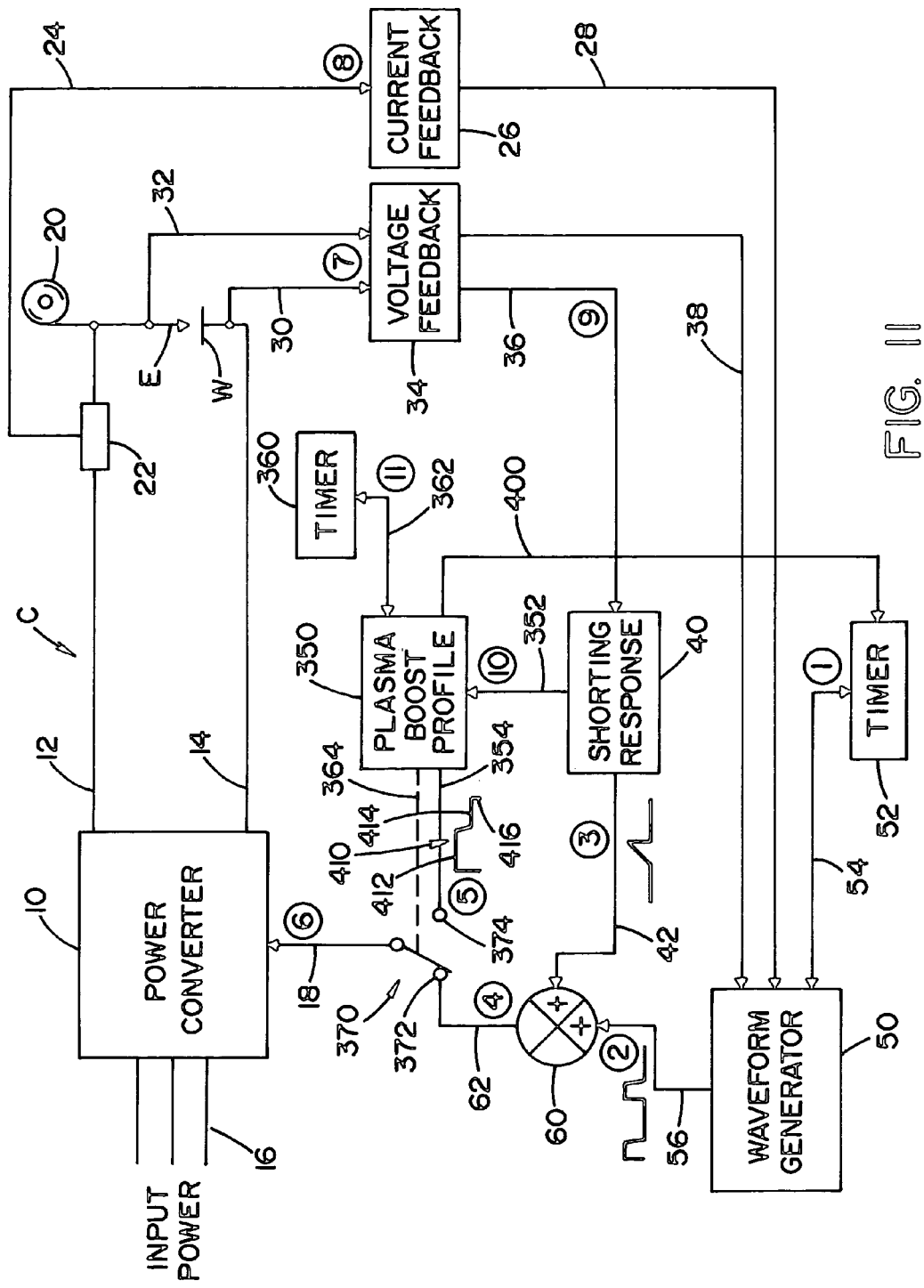
FIG. 11 is a combined block diagram and wiring diagram of an electric arc welder for performing the pulse welding process illustrated in FIG. 10.
Figure 12:
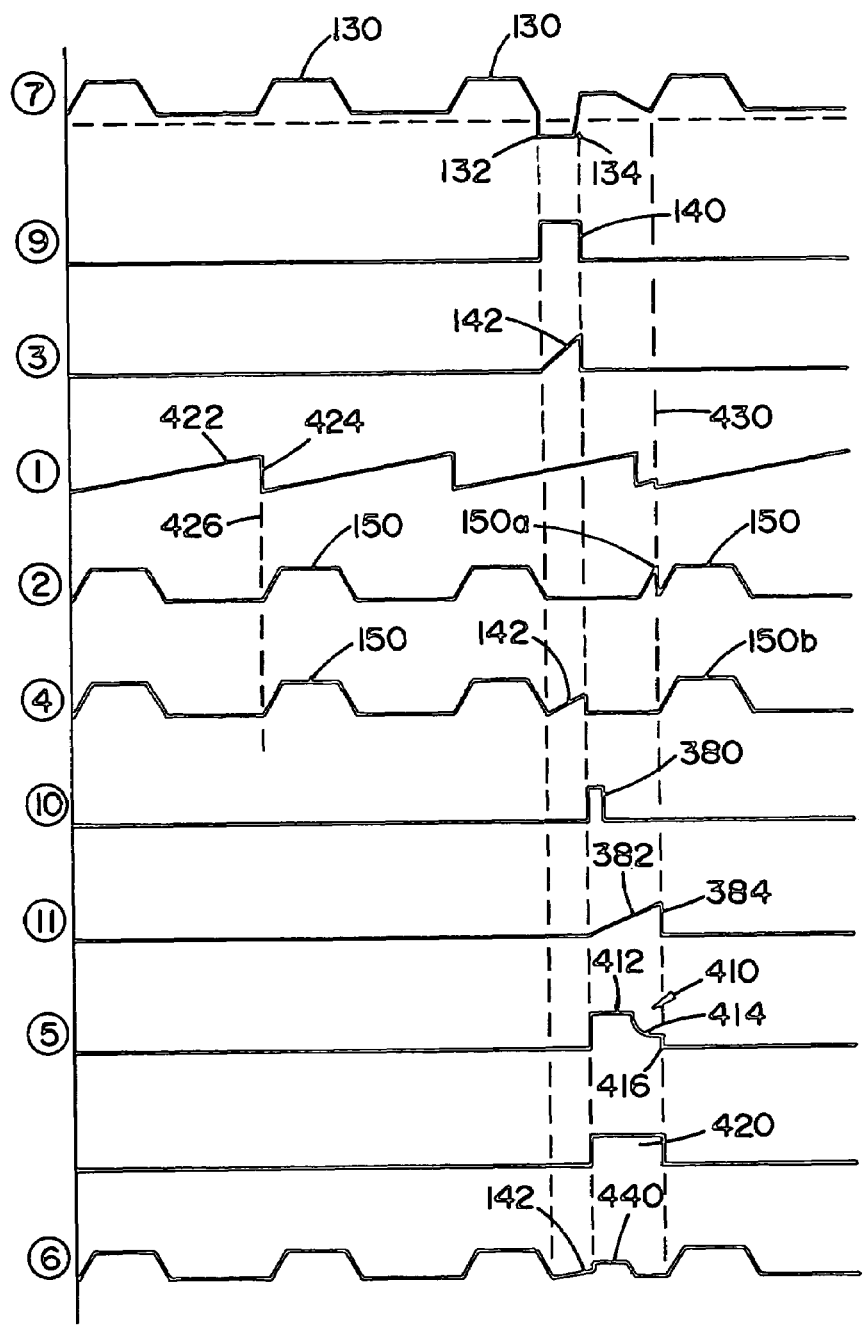
FIG. 12 is a graph showing signals at various locations in the electric arc welder illustrated in FIG. 11.

An addition can be made to the preferred embodiment of the present invention as illustrated in FIGS. 10-12 wherein the plasma boost pulse or routine is modified to promote consistent detachment of the molten metal. The plasma boost creates a molten droplet on the end of the electrode that will be transferred during the next pulse cycle. Once the plasma boost pulse is completed, the standard pulse waveforms are resumed. However, a short circuit will not occur at the same time for each of the pulses in the pulse welding process. Furthermore, the time required to clear a short is inconsistent from one short to the next. Consequently, the time the short clears in relationship to the next pulse determined by timer 52 will not be consistent. The remaining time after the plasma boost pulse is completed will be different when utilizing the preferred embodiment of the present invention. It is presumed that the background current 304 has sufficient time in the waveform created by waveform generator 50 to allow the electrode to travel closer to the puddle before the molten metal is transferred. This time is inconsistent from one short to the next for the reasons stated. Consequently, the position at the end of the electrode with respect to the puddle will not be consistent. A method for improving this consistency allows the end of the electrode to travel a consistent distance before the next pulse. This improvement in the basic method of the invention uses a dedicated background time and amplitude routine after the plasma boost itself has been processed. The waveform creating the plasma boost pulse is modified to include its own background current portion after the pulse. Consequently, timer 360 is used to control the duration of the plasma boost pulse and the background current time and magnitude. The plasma boost pulse serves to build a consistent droplet on the end of the electrode at a consistent distance from the puddle as shown in the top pictorial representations of FIG. 10. In order to maintain this consistent operation before the next pulse, a consistent time and amplitude for the background segment or portion is used in the modification of the preferred embodiment. This modification is shown in FIGS. 10-12. The plasma boost pulse is expanded to include a dedicated background amplitude and time. Timer 360 is used to set the time starting with the short circuit clearance signal appearing on line 352. In accordance with this modification of the present invention, electric arc welder C shown in FIG. 11 is modified to reset timer 52 at the end of the interrupt during which line 354 controls input 18. The reset signal is a signal on line 400. During the interrupt, plasma boost circuit 350 creates a signal 5 to generate a waveform 410 having a plasma boost pulse portion 412 and a background current portion 414 terminating at time 416. This is the time out of timer 360 to create a reset signal in line 400. When timer 360 starts its timing sequence, there is an interrupt shown as pulse 420 in FIG. 12. This is the same interrupt as previously described. Timer 52 times along line 422 as shown in FIG. 12. At position 424, timer 52 resets causing a signal at time 426 in line 54 to start the next pulse 150 in signal 2 of generator 50. In accordance with this embodiment of the invention, welder C creates a reset signal in line 400 when timer 360 reaches its set time at the end of the tailout section 414 at the plasma boost waveform 410. This reset signal is at time 430 shown in FIG. 12. Reset signal 1 terminates pulse 150 of signal 2 at the end of the plasma boost portion of waveform 410 to create a partial pulse 150a shown in FIG. 12. This then initiates the next pulse 150b of signal 4 shown in FIG. 12. During interrupt 420, a waveform 410 is created by circuit 350 on line 354. This waveform during the interrupt has a precise profile for the plasma boost pulse 412 and the background current portion or segment 414. Immediately after that background current portion has been implemented by power source 10, the next pulse 150b is caused to proceed. Consequently, when there is a short circuit there is a precise pulse and tail out or background current amplitude and time. This is shown in FIG. 10. The signal on line 18 by the interrupt position of switch 370 is a waveform 410 with pulse portion 412 and background current portion 414. A signal in line 400 occurs at time 416. This is when the predetermined waveform of the interrupt has been completed. Consequently, elements 412, 414 and 416 are consistent with each short. Thereafter, a new pulse 302 is initiated by timer 52. A signal 6 shown in FIG. 12 is applied to input 18 for controlling the profile of the current or power between electrode E and workpiece W. The new profile is profile 440 in FIG. 12. Consequently, the output of waveform generator 50 is interrupted at the end of the short and a given pulse and background current segment is processed. The result of this waveform is shown in positions I-III in FIG. 10. Upon creation of portion 412, the arc force pushes puddle P so it moves away from the end of electrode E. This is shown at position I. Thereafter, the background current portion allows puddle P to reform in a uniform manner. This is shown at position II. At the end of the profiled waveform 410, the molten metal M is ready to be transferred to workpiece W as shown at position III. This creates a consistent operation after each short circuit. Such modification of the preferred embodiment improves the quality of the weld while still maintaining the advantages of using a plasma boost pulse at the end of the short circuit. Consequently, the plasma boost signal includes a dedicated background portion 304 with a selected amplitude and duration, which is at a different level than level 414 in FIG. 10. The interrupt signal is maintained through waveform 410 including plasma boost pulse 412 and dedicated background portion or segment 414. Timer 52 is reset at the end of a dedicated background time. During the dedicated background portion, the waveform generator is ignored because the interrupt has switched control of input 18 to the output of plasma boost control circuit 350. The waveform generator is reset by timer 52.

Figure 13:
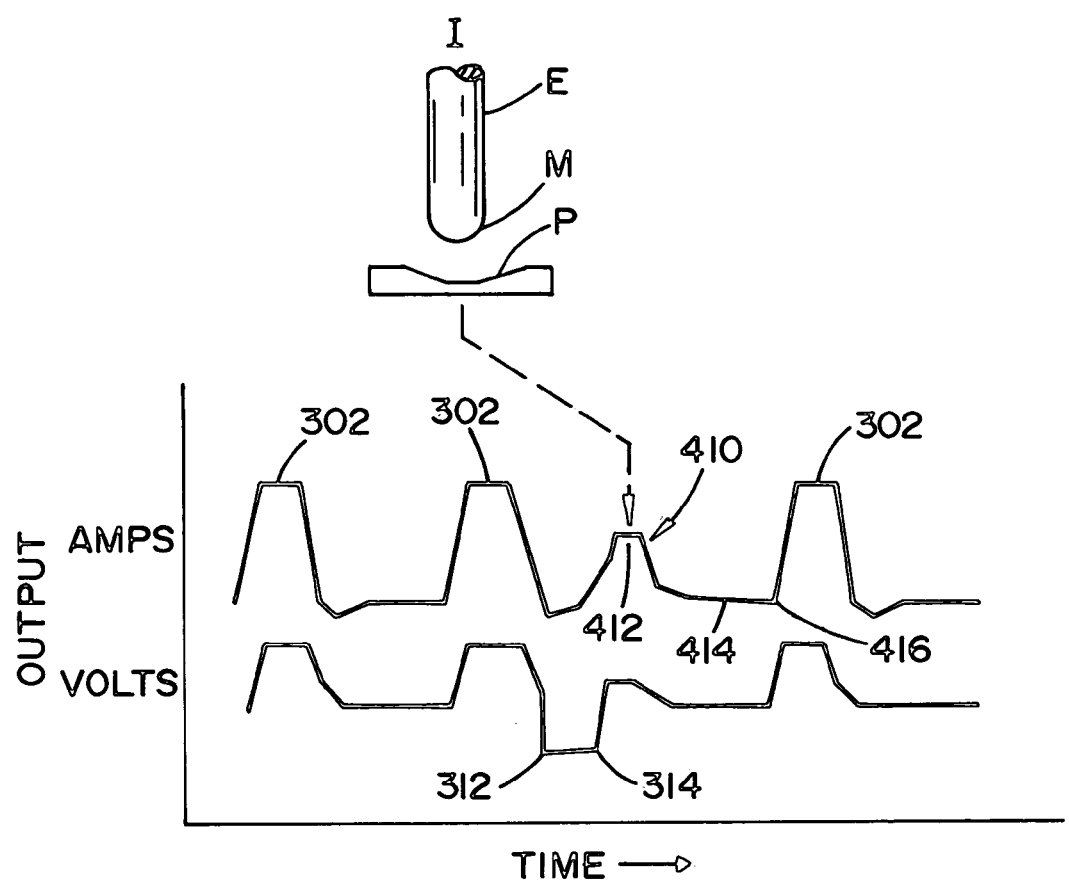
FIG. 13 is a graph with a voltage curve and current curve of a modification in the pulse welding process illustrated in FIGS. 10-12 wherein the background is adaptively adjusted.
Figure 14:
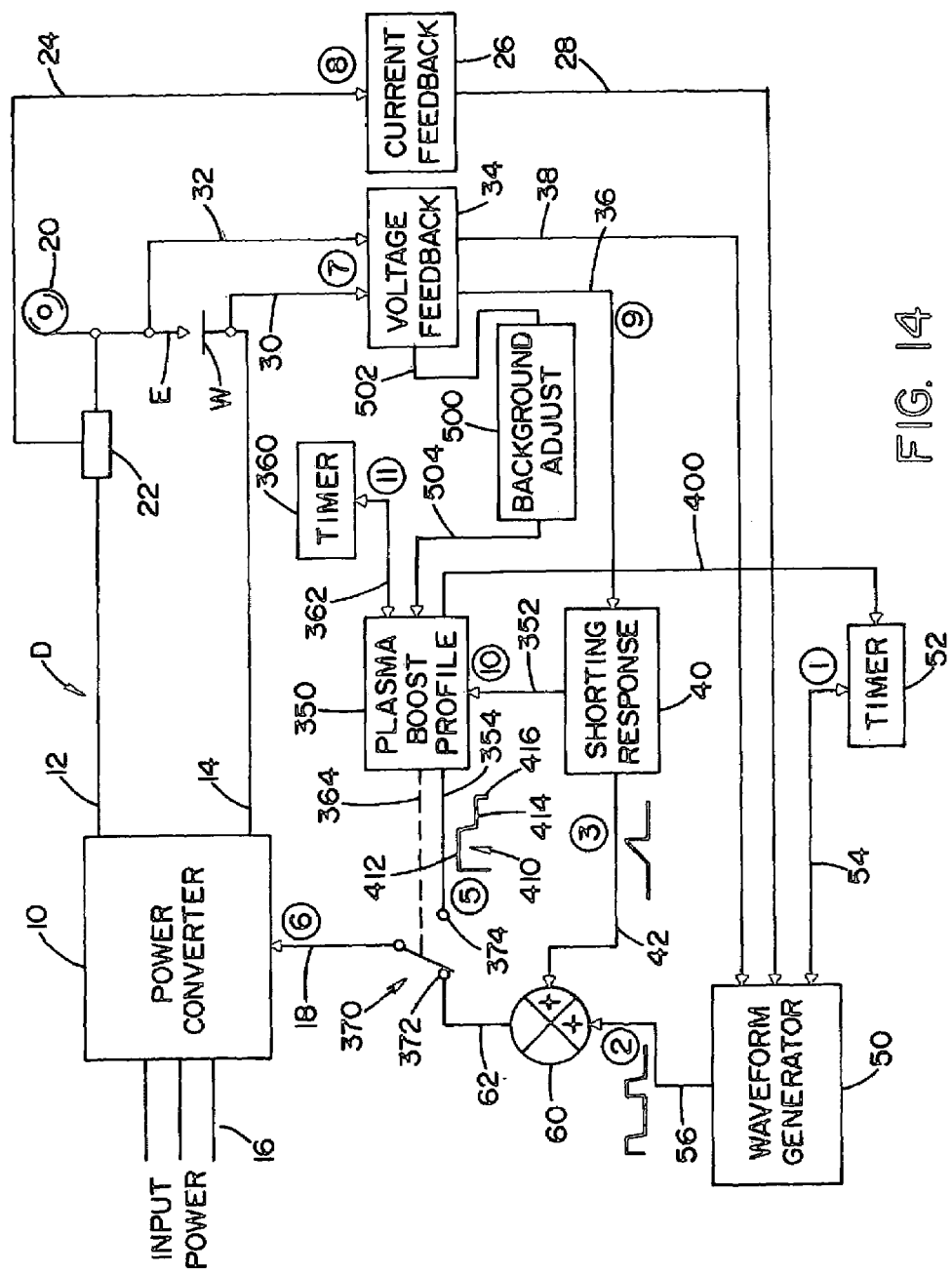
FIG. 14 is a combined block diagram and wiring diagram of an electric arc welder for performing the adaptive procedure illustrated in FIG. 13.
Figure 15:
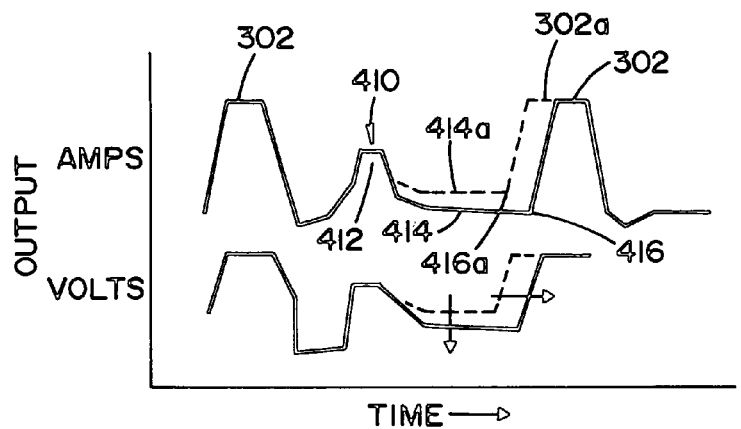
FIG. 15 is a graph similar to FIG. 13 illustrating the adaptive feature of the welding process.

A slight modification of the embodiment illustrated in FIGS. 10-12 is disclosed in FIGS. 13-15. Molten metal M formed on the end of the electrode after the plasma boost pulse will vary according to certain conditions during the plasma boost pulse. Consequently, a feedback loop sensing the arc voltage during the plasma boost pulse can be used to adjust the dedicated background segment 414. The arc voltage during the plasma boost pulse indicates the arc length during the pulse. This arc length is used to calculate background current portion amplitude and/or duration. Since the plasma boost is defined as a function of power, the voltage feedback is used to calculate the relative arc length and modify the background amplitude and/or duration. Adapting the background amplitude and duration will promote even more consistency of the electrode placement with regard to the puddle after a short circuit. An independent adaptive control is used in welder D shown in FIG. 14. This adaptive loop modifies background portion 414 in accordance with the sensed arc voltage occurring during the pulse portion 412 of waveform 410. The gain of this second adaptive control loop must be set so that the short plasma boost will directly affect the next background current segment. Consequently, only the background current amplitude and duration for the interrupt being processed is adapted. Thus, electric arc welder D allows the plasma boost to be controlled by an arc voltage feedback loop. To this end, adjustment of the amplitude and duration of the background portion 414 is accomplished by circuit 500 having an input 502 representing the arc voltage from voltage sensor 34. Output 504 is communicated with the plasma boost circuit to adjust the background portion during the interrupt determined by the time switch 370 is in the interrupt position 374. This novel concept is best illustrated by a comparison of FIG. 13 and FIG. 15. In FIG. 13, the background portion 414 (normally current) is a fixed profile, as previously described. Voltage from line 502 in FIG. 14 adjusts portion 414 into the dashed line configuration of FIG. 15 where the new background portion 414a of waveform 410 terminates at a new point 416a. Portion 414a is adjusted by the arc voltage during pulse portion 412, which voltage essentially corresponds to the arc length during the plasma boost pulse portion of waveform 410. Otherwise, electric arc welder D shown in FIG. 14 is the same as welders A, B and C, as previously described.

Figure 16:
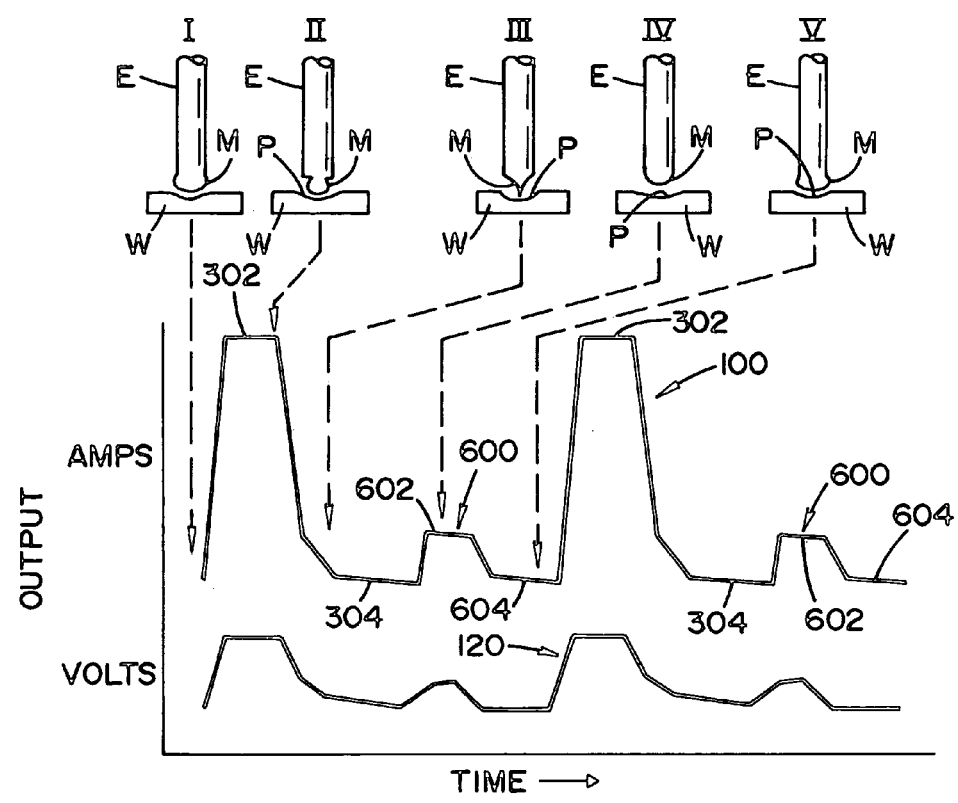
FIG. 16 is a graph including a voltage curve and a current curve of a pulse welding process incorporating a plasma boost and background segment between each pulse of the pulse welding process.
Figure 17:
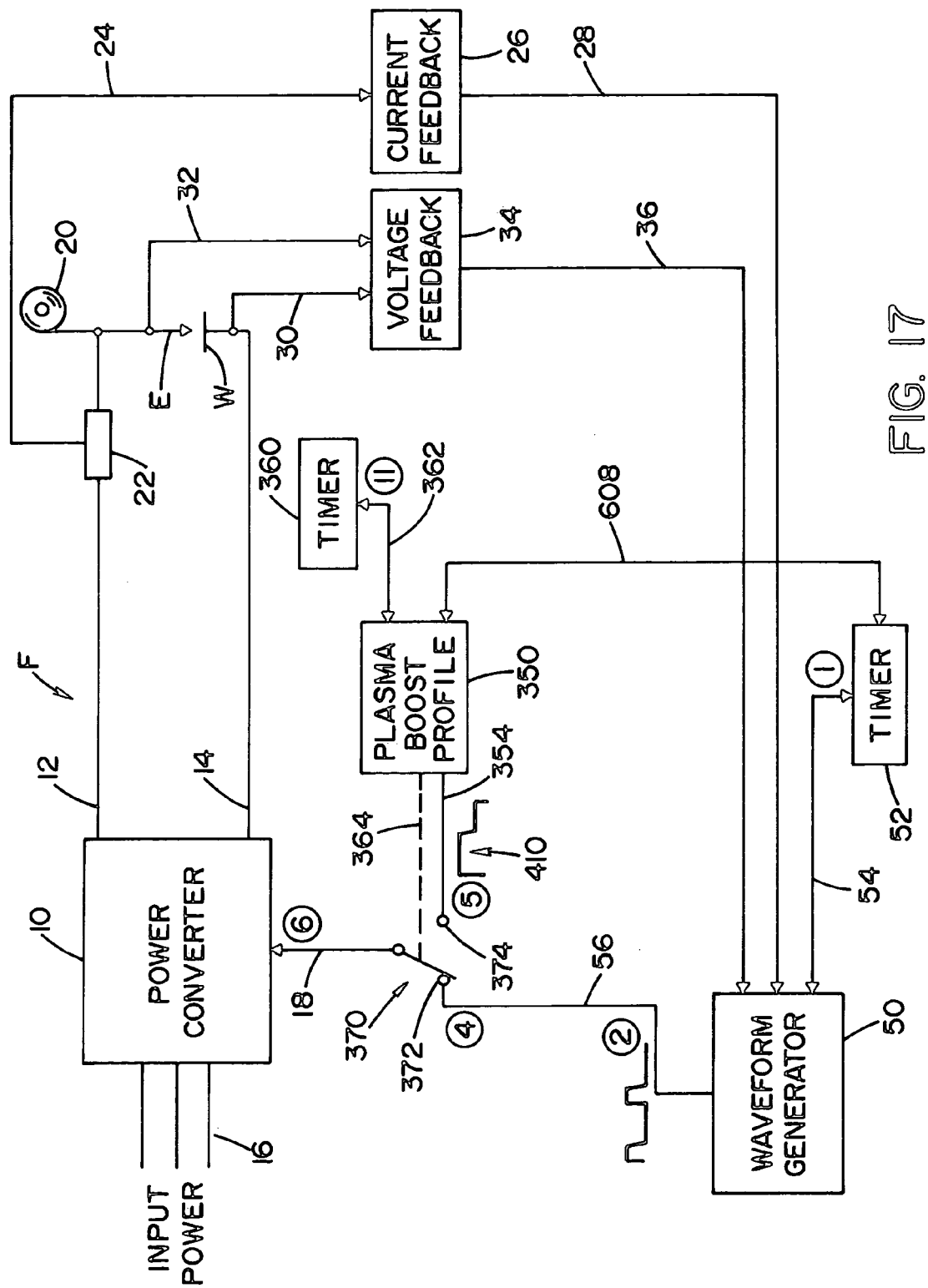
FIG. 17 is a combined block diagram and wiring diagram showing an electric arc welder for performing the pulse welding process illustrated in FIG. 16.
Figure 18:
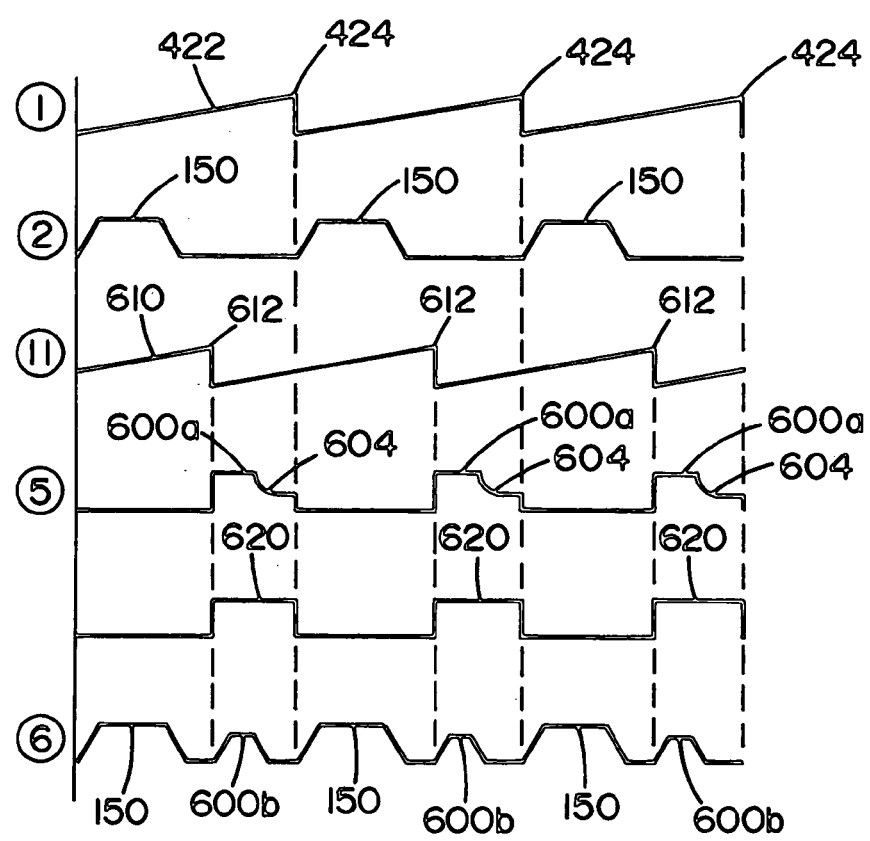
FIG. 18 is a graph illustrating signals at various locations in the electric arc welder of FIG. 17.

Another use of the plasma boost pulse is described in FIGS. 16-18. Plasma boost pulse 600 with a boost pulse portion 602 and background portion 604 is inserted between each pulse 302 of curves 100, 120 as shown in FIG. 16. In this manner, the plasma boost pulse preheats the end of the electrode and creates a droplet for the next pulse 302 for transfer to the molten metal puddle P. The first segment of the plasma boost pulse is a pulse that will preheat the end of the electrode and create a droplet. This preheat has been advantageously used in GMAW-pulse welding using non-ferrous metals, such as nickel alloys and titanium. In this process of a boost pulse between each standard pulse, metal cored wires and flux cored wires, as shown in FIGS. 4 and 5, have been used to provide FCAW-G and FCAW-S welding processes. The process is implemented by electric arc welder F which differs from welder C shown in FIG. 11 by removing the shorting response circuit 40 and providing a two way reset line 608. The output of plasma boost profile circuit 350 is the fixed waveform 410 directed to input 18 when switch 370 is shifted to the interrupt position 374 by the logic on line 364. This line is signal 11 shown in FIG. 18 where timer 360 times along portion 610 until it reaches its set count at point 612. Interrupt pulse 620 is in existence when switch 370 is held in the interrupt position 374. The interrupt is started at time 612 when timer 360 starts. When the timer starts at time 612, the output on line 354 is a waveform with profile 600a shown in FIG. 18. Timer 52 starts the next pulse 150 at time 424 and terminates interrupt 620 at this time. Thus, during interrupt 620 waveform 600a is directed through line 354 to input 18. Thus, signal 6 alternates between signal 2 from waveform generator 50 and fixed pulse profile shape 600b corresponding to waveform 410 in line 354. During the time between timer resets, the interrupt is being processed to drive power source by input 18 from circuit 350. Thus, a plasma boost pulse 600 is routinely implemented between the normal pulse 302 by power source 10. The operation of this use of the power boost pulse is best illustrated at the upper portion of FIG. 16 where electrode E is melted so that molten metal M is transferred to workpiece W between positions I and II. Then, in accordance with standard pulse welding technology, molten metal M is transferred to puddle P of workpiece W as shown in position III. At position IV waveform 600 including a high power plasma boost is implemented between electrode E and workpiece W. This waveform causes action of puddle P shown in position IV. When the fixed background portion 604 of plasma boost pulse waveform 600*a* is applied through the arc, puddle P recedes toward the molten metal M and awaits the next transfer pulse 302. This is shown at position V. the pulse portion of waveform 600*a* will heat the end of the electrode and create a molten droplet that is transferred during the next pulse. This method can be used alone or in combination with the timing sequence shown in FIG. 18. Other arrangements can be used to insert a plasma boost pulse between the standard current pulses 302 from waveform generator 50. Welder F could have the background adjustment feature of welder D as shown in FIG. 14 as an option. Preferably, the tailout for waveform 600*a* is fixed. Adaptive feedback from the voltage or arc length is optional.

Figure 23:
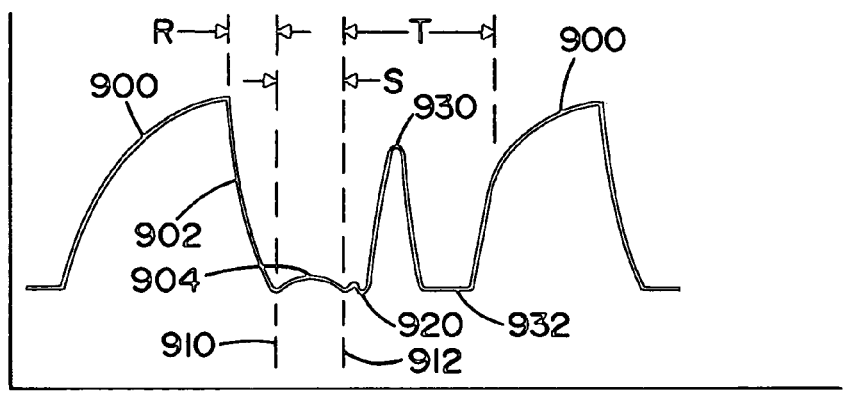

FIG. 23 is a current curve of the practical implementation of the novel process where a plasma boost pulse is created between each pulse of a standard pulse welding process. A short circuit at point 910 occurs after each pulse 900. This short circuit is not at the peak of pulse 900, but is after decay portion 902. The short is cleared naturally by the rhythmic movement of the puddle to create a current hump 904. There is a delay before the short circuit clearance routine increases the current as so far explained. If the short circuit is cleared naturally before the delay expires, there is no clearing current increase. Thus, the short is often cleared at point 912 before there is a rush of short clearing current. This second signal at point 912 is the trailing edge of pulse 140 in signal 9 as shown in FIG. 9. When the second signal is created from voltage sensing device 34, the short is cleared and plasma boost pulse 930 is created. Because of inherent time delays in the circuitry, there is a slight time delay 920 between the second signal at point 912 and start of pulse 930. Thereafter, background current 932 continues to the next pulse. The slight delay before clearing current would be before creation of pulse 142 in FIG. 9, but during the short the delay may be greater than the time to clear the short naturally. If the short is cleared before the delay has expired, then the welder goes directly into the plasma boost with its inherent delay 920. During pulse 900, there is a sudden increase in current to increase the arc energy to form and squeeze a molten droplet extending from the end of the electrode. During time R, the pulse is ramped down to relax the plasma force depressing the molten puddle. This allows the puddle to rise toward the droplet. When there is a short at point 910, the droplet has contacted the puddle. As soon as the short terminates at point 912, a gentle plasma boost pulse pushes the puddle away and conditions the electrode tip. This assures reliable separation of the metal from the tip and the puddle resulting in a stable rhythm of the cycles. The delay before the clearing current allows the short to clear by the rhythm and not by a clearing current. If it does not clear during the delay, then the standard current clearing routine is implemented. The second signal at point 912 informs the controller that the short has been cleared whether naturally or by a clearing current. Then the plasma boost pulse is outputted. This is the practical operation of the welder in FIGS. 16-18.

Figure 19:
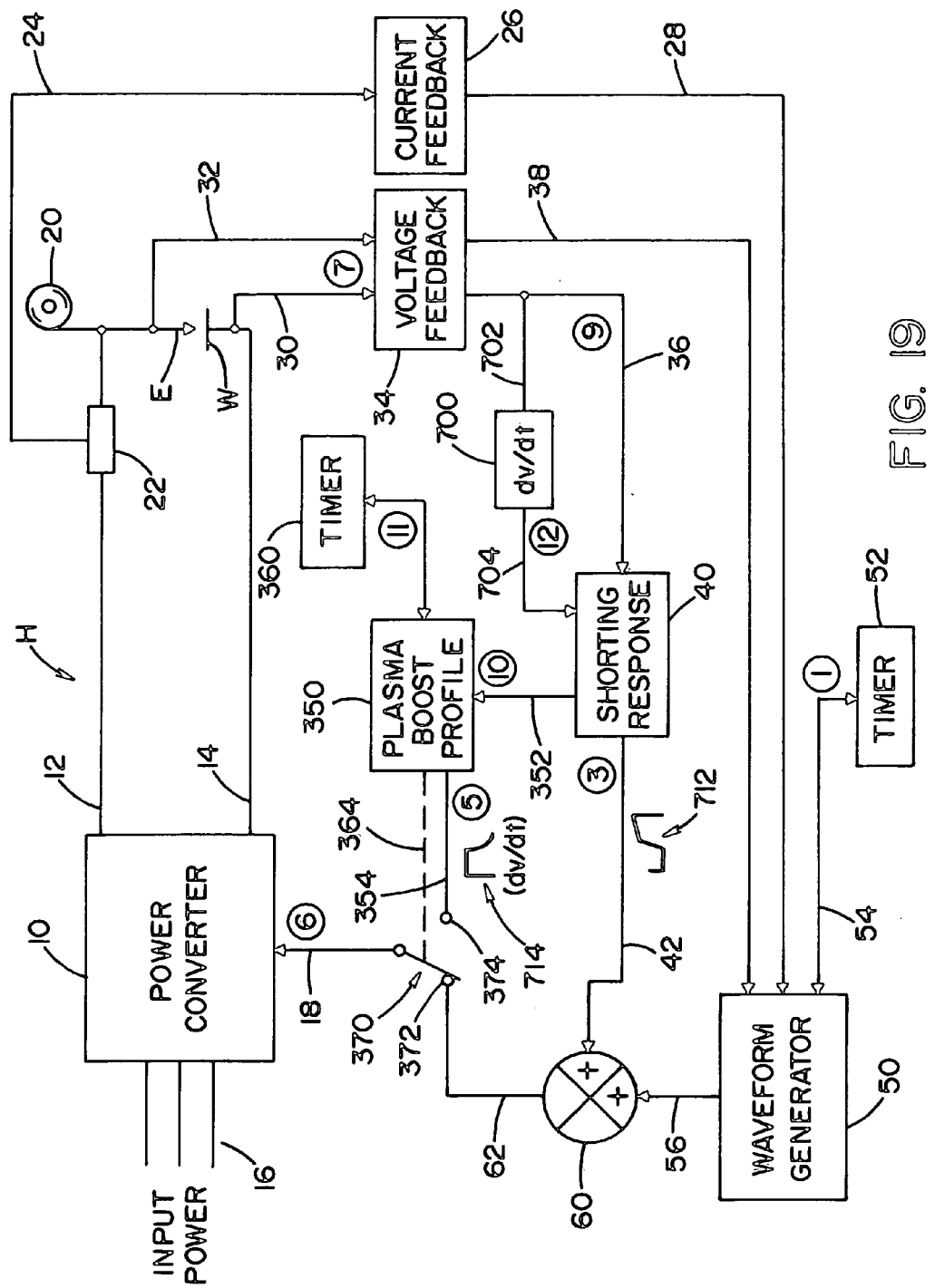
FIG. 19 is a combined block diagram and wiring diagram of an electric arc welder for performing the pulse welding process explained in FIGS. 20 and 21.
Figure 20:
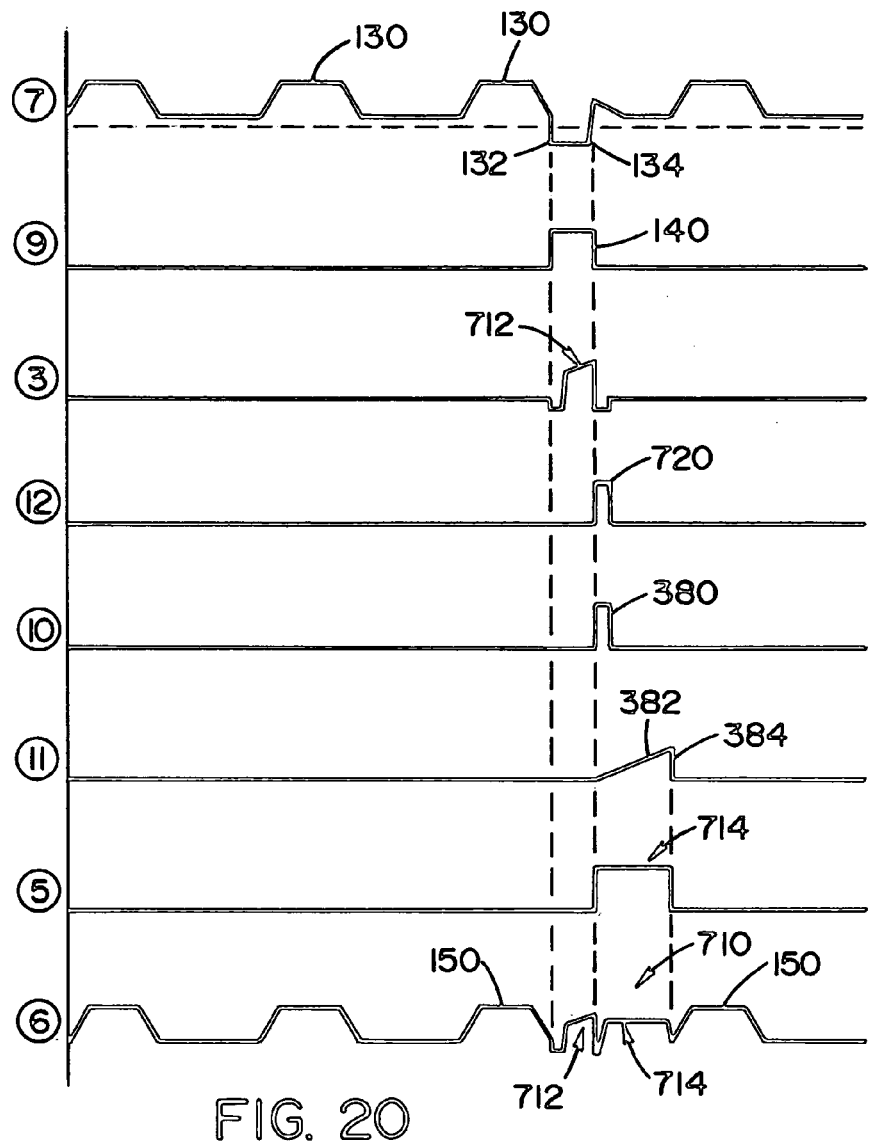
FIG. 20 is a graph showing signals at various locations in the welder illustrated in FIG. 19.
Figure 21:
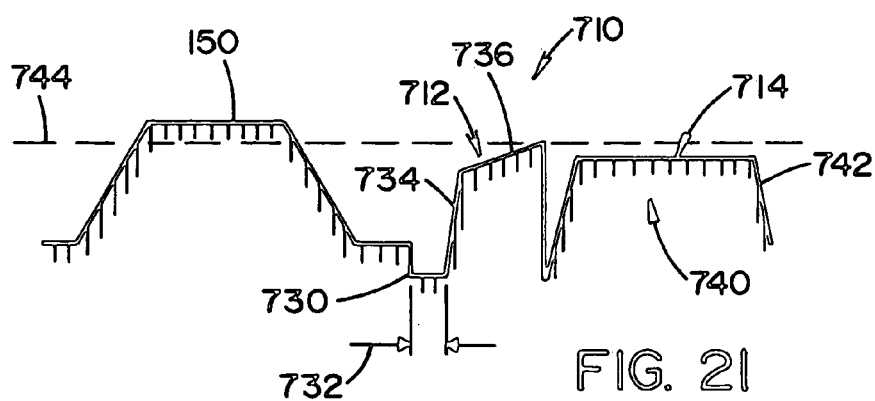
FIG. 21 is an illustration of the waveform using the welder shown in FIG. 19 and the signals of FIG. 20.

The use of a waveform including a plasma boost pulse portion with a different short circuit clearing routine is another aspect of the present invention and is shown in FIGS. 19-21. Welder H is similar to welder C disclosed in FIG. 11 with the addition of a standard premonition circuit 700 with an input 702 and an output 704. A logic on the output indicates when the dv/dt of the arc voltage from sensor 34 exceeds a given level indicating an impeding short circuit during the clearance routine for a short circuit. The dv/dt circuit is standard and detects a slope equal to or greater than a reference value signaling the short is about to break. This circuit stops the shorting response circuit 40 so that the signal in line 352 terminates the arc portion 712 of waveform 710 shown in FIG. 21 and initiates the plasma portion 714 on output 354 of plasma boost profile circuit 350. The output 704 of premonition circuit 700 is shown as pulse 720 in signal 12, one of the many number signals of welder H shown in FIG. 20. The various numbered signals in FIG. 20 correspond to the numbers used in FIG. 19. Welder H generates the signals shown in FIG. 20, which signals are essentially the same as the like numbered signals illustrated in FIG. 11 for welder C. The basic difference between welder H and welder C relates to short clearing portion 712 of waveform 710. When the short occurs at point 132 shown in FIG. 20, waveform portion 712 of waveform 710 is implemented by the shorting response circuit 40. This portion of the waveform is different and includes a immediate reduction in current at the time of the short represented by portion 730. Circuit 40 holds the current low for a preset time 732, after which a clearance routine for the short circuit is implemented. This routine starts with a rapid increase in current along slope portion 734 followed by a second slope portion 736 which is somewhat more gradual. As this current increase is directed through the short circuit, the short circuit begins to neck causing an increase in the dv/dt. When this derivative reaches a specific level pulse 720 is created. This pulse immediately plunges the current to a low level similar to the level at reduction point 730. The premonition relation can be dv/dt, di/dt, dp/dt or other derivatives of time. Reduction of current caused by pulse 720 also starts waveform portion 714 of general waveform 710 illustrated in FIG. 21. In another embodiment, waveform 710 is started by a break in the short circuit. Waveform portion 714 includes the plasma boost pulse 740 having a tailout portion 742. This tailout portion is more distinct in FIG. 19, but has a variety of configurations. Welder H utilizes a unique short circuit clearing procedure whereby the termination of the clearing routine is determined by the impending rupture of the short circuit, as opposed to a voltage detector employed in welder C. Otherwise, the clearing procedure is generally the same. The exception is the reduced current portion for time 732. Metal transfer line or current 744 is less than the peak current, but greater than the maximum current of the plasma boost pulse. When there is a short, the short circuit is cleared and a plasma boost pulse is initiated to force the molten metal puddle from the advancing electrode while the advancing electrode is forming a molten metal ball for the next transfer. By using waveform 710 shown in FIG. 21, transfer of metal by short circuit is not disruptive and may even be advantageous. Indeed, it has been found when using the invention that transfer by a short circuit process after each pulse 150 of the pulse welding process has some advantages. Consequently, a modification of the invention has been developed which relies upon transfer of metal by short circuit in a pulse welding process. This modification uses the novel plasma boost pulse of the invention and is described in FIG. 22.

Figure 22:
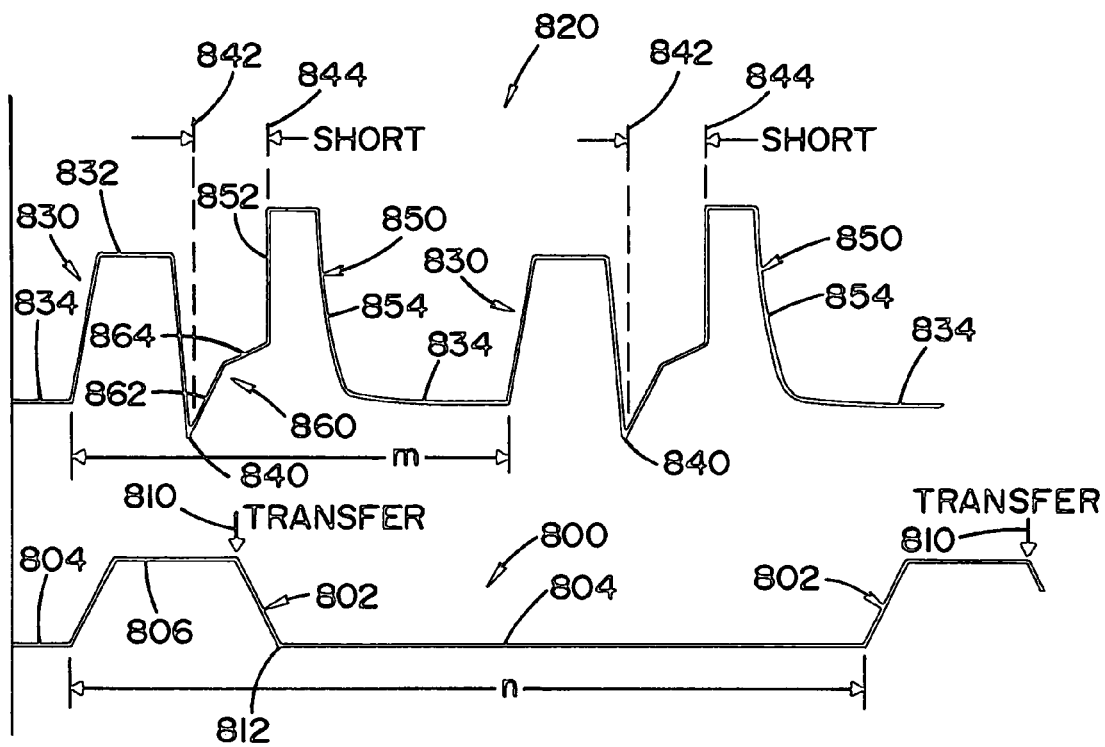
FIG. 22 is an illustration of a waveform obtained by using the invention with control of the pulse welding process to assure a short circuit; and, FIG. 23 is a current curve showing a practical waveform when using the welder as shown in FIGS. 16-18.

The use of the novel plasma boost pulse in a pulse welding process for the purpose of actually transferring metal by short circuit transfer, instead of the normal spray transfer is illustrated in FIG. 22. This aspect of the invention uses the elements from various electric arc welders so far described in detail. A normal pulse welding waveform is illustrated as curve 800 having pulses 802 separated by background current portions 804 and spaced to produce a period n. Each peak current stage 806 has a length or process time to melt the advancing electrode for the purposes of spray transfer as is normal. This transfer through the arc occurs at the end of the peak current stage and shown as point 810. Pulse 802 is intended to have enough energy to melt and propel a droplet of molten metal toward the workpiece. If this action does not occur, there will be a short circuit created when the molten metal ball on the end of the advancing wire contacts the molten metal of the puddle. This contact creates a short circuit indicated at point 812 to implement and bring into operation the method so far described where a short circuit creates a metal clearance routine and then provides the novel plasma boost pulse, with or without a controlled secondary background current. For the purposes of explaining the differences between a normal pulse welding process and the aspect of the invention shown in FIG. 22, the parameters of a representative normal pulse welding process using curve 800 are helpful.

Peak current 806 has a value of 550 amperes and a length of time of about 2.0 ms. Background current 804 has a level of 90 amperes while period n is about 8.3 ms. These parameters are representative of a pulse welding process to which the invention has been added, as previously described. In FIG. 22 the present invention is used in a process that utilizes a short circuit condition to transfer the molten metal. This process can be employed due to the quiet puddle dynamics resulting from use of the present invention. The new pulse weld process of FIG. 22 is illustrated by curve 820 where current pulses 830 are provided at a frequency which is increased as much as twice the frequency used in curve 800. With this high frequency, period m between pulses 830, when compared to a normal pulse welding process, can be reduced to about 4.3 ms. The template for the process depicted as curve 820 also has other modifications from the normal pulse welding curve 800. For instance, the peak current is reduced to a level, such as 475 amperes, and has a shortened time of 1.5 ms. These are representative parameters, but indicate that pulse 830 is not intended to actually separate the molten metal from the electrode and propel it toward the workpiece as done by pulse 802. Consequently, as the wire electrode is advancing toward the workpiece, pulse 830 merely forms a molten metal ball on the end of the wire. As the peak current is decreased, the molten metal ball on the end of the advancing wire progresses toward the molten metal puddle. In accordance with the illustrated embodiment of the invention shown in FIG. 22, the reduction of current after the peak stage 832 is below background current level 834 to a lower current point 840. This reduces the amount of arc force between the advancing molten metal ball and the molten metal puddle. The puddle, thus, rises toward the ball as the ball is moving toward the molten metal puddle. This causes a short circuit at point 842. This short circuit is detected as previously described. The present invention then creates waveform 850. This waveform includes a pulse portion 852 and a tailout portion 854. This waveform occurs during the plasma portion when there is an arc to initiate melting of the advancing wire preparatory to the next pulse 830. As previously described a clearing circuit is activated at point 842 to provide a clearance routine having two slope portions 862, 864. By using the invention disclosed in FIG. 22 curve 820 provides pulses at a higher frequency and with less energy in the pulses. A circuit activated at the end of a pulse plunges the arc current to assure a short circuit. Thus, a short circuit metal transfer is effected. The advantage of using the novel plasma boost waveform following termination of the actual short circuit allows the use of this novel pulse welding process.

Several pulse welders and welding methods have been described. Features of the various welders and methods can be combined or eliminated in accordance with the desires of the manufacturer and/or user. It is expected that certain modifications from one embodiment will be used in other embodiments that do not present technical inconsistencies.

Having thus defined the invention, the following is claimed:

1. An electric arc welder for performing a pulse welding process by a voltage driven current between an advancing electrode and a workpiece, said pulse welding process including a series of successive waveforms each having a pulse defined by a peak current beginning when the electrode is separated from the workpiece and a background current portion, said welder having an output voltage and comprising: a short detecting circuit creating a short signal upon occurrence of a short circuit between said advancing electrode and said workpiece, a circuit for clearing the short circuit in response to the short signal, and a boost circuit to create a plasma boost pulse after the short circuit has been cleared.

2. An electric arc welder as defined in claim 1 including a circuit to increase said current after said signal and before said plasma boost pulse.

3. An electric arc welder as defined in claim 2 wherein said plasma boost pulse has a regulated power of 5-20 KW.

4. An electric arc welder as defined in claim 3 wherein said plasma boost pulse has a duration of 0.2-5.0 ms.

5. An electric arc welder as defined in claim 3 wherein said electrode is a cored wire.

6. An electric arc welder as defined in claim 5 wherein said voltage is less than 25 volts.

7. An electric arc welder as defined in claim 5 wherein the arc length is less than 0.30 inches.

8. An electric arc welder as defined in claim 5 wherein said cored wire is a metal cored wire with an effective amount of sulfur in the core.

9. An electric arc welder as defined in claim 8 wherein said sulfur is in the range of 0.010 to 0.030 percent by weight of the electrode.

10. An electric arc welder as defined in claim 3 including a timer to set the period of said pulse of said pulse welding process and a circuit responsive to the end of the background segment to reset said timer.

11. An electric arc welder as defined in claim 3 wherein said voltage is less than 25 volts.

12. An electric arc welder as defined in claim 3 wherein the arc length is less than 0.30 inches.

13. An electric arc welder as defined in claim 2 wherein said plasma boost pulse has a duration of 0.2-5.0 ms.

14. An electric arc welder as defined in claim 13 wherein said electrode is a cored wire.

15. An electric arc welder as defined in claim 14 wherein said voltage is less than 25 volts.

16. An electric arc welder as defined in claim 14 wherein the arc length is less than 0.30 inches.

17. An electric arc welder as defined in claim 14 wherein said cored wire is a metal cored wire with an effective amount of sulfur in the core.

18. An electric arc welder as defined in claim 17 wherein said sulfur is in the range of 0.010 to 0.030 percent by weight of the electrode.

19. An electric arc welder as defined in claim 13 wherein said boost circuit creates a controlled, background current segment following said plasma boost pulse.

20. An electric arc welder as defined in claim 19 including a timer to set the period of said pulse of said pulse welding process and a circuit responsive to the end of the background segment to reset said timer.

21. An electric arc welder as defined in claim 19 including a circuit to sense said arc voltage during said plasma boost pulse and a circuit to adjust said background segment based upon said sensed arc voltage.

22. An electric arc welder as defined in claim 2 wherein said electrode is a cored wire.

23. An electric arc welder as defined in claim 22 wherein said boost circuit creates a controlled, background current segment following said plasma boost pulse.

24. An electric arc welder as defined in claim 23 including a timer to set the period of said pulse of said pulse welding process and a circuit responsive to the end of the background segment to reset said timer.

25. An electric arc welder as defined in claim 23 including a circuit to sense said arc voltage during said plasma boost pulse and a circuit to adjust said background segment based upon said sensed arc voltage.

26. An electric arc welder as defined in claim 22 wherein said voltage is less than 25 volts.

27. An electric arc welder as defined in claim 22 wherein the arc length is less than 0.30 inches.

28. An electric arc welder as defined in claim 22 wherein said cored wire is a metal cored wire with an effective amount of sulfur in the core.

29. An electric arc welder as defined in claim 28 wherein said sulfur is in the range of 0.010 to 0.030 percent by weight of the electrode.

30. An electric arc welder as defined in claim 2 wherein said plasma boost pulse is by regulation of arc current.

31. An electric arc welder as defined in claim 30 wherein said boost circuit creates a controlled, background current segment following said plasma boost pulse.

32. An electric arc welder as defined in claim 31 including a timer to set the period of said pulse of said pulse welding process and a circuit responsive to the end of the background segment to reset said timer.

33. An electric arc welder as defined in claim 31 including a circuit to sense said arc voltage during said plasma boost pulse and a circuit to adjust said background segment based upon said sensed arc voltage.

34. An electric arc welder as defined in claim 2 wherein said plasma boost pulse is by regulation of arc voltage.

35. An electric arc welder as defined in claim 34 wherein said boost circuit creates a controlled, background current segment following said plasma boost pulse.

36. An electric arc welder as defined in claim 35 including a circuit to sense said arc voltage during said plasma boost pulse and a circuit to adjust said background segment based upon said sensed arc voltage.

37. An electric arc welder as defined in claim 2 wherein said plasma boost pulse is by regulation of arc power.

38. An electric arc welder as defined in claim 37 wherein said boost circuit creates a controlled, background segment following said plasma boost pulse.

39. An electric arc welder as defined in claim 38 including a timer to set the period of said pulse of said pulse welding process and a circuit responsive to the end of the background segment to reset said timer.

40. An electric arc welder as defined in claim 38 including a circuit to sense said arc voltage during said plasma boost pulse and a circuit to adjust said background segment based upon said sensed arc voltage.

41. An electric arc welder as defined in claim 2 wherein said plasma boost pulse is regulated by a slope output characteristic.

42. An electric arc welder as defined in claim 2 including a timer to set the period of said pulses of said pulse welding process.

43. An electric arc welder as defined in claim 2 wherein said boost circuit creates a controlled, background current segment following said plasma boost pulse.

44. An electric arc welder as defined in claim 43 including a timer to set the period of said pulse of said pulse welding process and a circuit responsive to the end of the background segment to reset said timer.

45. An electric arc welder as defined in claim 43 including a circuit to sense said arc voltage during said plasma boost pulse and a circuit to adjust said background segment based upon said sensed arc voltage.

46. An electric arc welder as defined in claim 2 wherein said voltage is less than 25 volts.

47. An electric arc welder as defined in claim 2 wherein the arc length is less than 0.30 inches.

48. An electric arc welder as defined in claim 1 wherein said plasma boost pulse has a regulated power of 5-20 KW.

49. An electric arc welder as defined in claim 48 wherein said plasma boost pulse has a duration of 0.2-5.0 ms.

50. An electric arc welder as defined in claim 48 wherein said electrode is a cored wire.

51. An electric arc welder as defined in claim 50 wherein said voltage is less than 25 volts.

52. An electric arc welder as defined in claim 50 wherein the arc length is less than 0.30 inches.

53. An electric arc welder as defined in claim 50 wherein said cored wire is a metal cored wire with an effective amount of sulfur in the core.

54. An electric arc welder as defined in claim 53 wherein said sulfur is in the range of 0.010 to 0.030 percent by weight of the electrode.

55. An electric arc welder as defined in claim 48 including a timer to set the period of said pulses of said pulse welding process.

56. An electric arc welder as defined in claim 48 wherein said boost circuit creates a controlled, background current segment following said plasma boost pulse.

57. An electric arc welder as defined in claim 56 including a timer to set the period of said pulse of said pulse welding process and a circuit responsive to the end of the background segment to reset said timer.

58. An electric arc welder as defined in claim 56 including a circuit to sense said arc voltage during said plasma boost pulse and a circuit to adjust said background segment based upon said sensed arc voltage.

59. An electric arc welder as defined in claim 48 wherein said voltage is less than 25 volts.

60. An electric arc welder as defined in claim 48 wherein the arc length is less than 0.30 inches.

61. An electric arc welder as defined in claim 48 wherein said pulse welding process includes a succession of waveforms and said waveforms are created by a series of short current pulses generated at a frequency greater than 18 kHz and with a profile controlled by a waveform generator.

62. An electric arc welder as defined in claim 61 including an interrupt circuit to interrupt said waveform upon occurrence of a short circuit between said electrode and said workpiece.

63. An electric arc welder as defined in claim 62 wherein a waveform profile of a plasma boost pulse is processed by said welder during said interrupt.

64. An electric arc welder as defined in claim 1 wherein said plasma boost pulse has a duration of 0.2-5.0 ms.

65. An electric arc welder as defined in claim 64 wherein said electrode is a cored wire.

66. An electric arc welder as defined in claim 65 wherein said voltage is less than 25 volts.

67. An electric arc welder as defined in claim 65 wherein the arc length is less than 0.30 inches.

68. An electric arc welder as defined in claim 65 wherein said cored wire is a metal cored wire with an effective amount of sulfur in the core.

69. An electric arc welder as defined in claim 68 wherein said sulfur is in the range of 0.010 to 0.030 percent by weight of the electrode.

70. An electric arc welder as defined in claim 64 including a timer to set the period of said pulses of said pulse welding process.

71. An electric arc welder as defined in claim 64 wherein said boost circuit creates a controlled, background current segment following said plasma boost pulse.

72. An electric arc welder as defined in claim 71 including a timer to set the period of said pulse of said pulse welding process and a circuit responsive to the end of the background segment to reset said timer.

73. An electric arc welder as defined in claim 71 including a circuit to sense said arc voltage during said plasma boost pulse and a circuit to adjust said background segment based upon said sensed arc voltage.

74. An electric arc welder as defined in claim 64 wherein said pulse welding process includes a succession of waveforms and said waveforms are created by a series of short current pulses generated at a frequency greater than 18 kHz and with a profile controlled by a waveform generator.

75. An electric arc welder as defined in claim 74 including an interrupt circuit to interrupt said waveform upon occurrence of a short circuit between said electrode and said workpiece.

76. An electric arc welder as defined in claim 75 wherein a waveform profile of a plasma boost pulse is processed by said welder during said interrupt.

77. An electric arc welder as defined in claim 1 wherein said electrode is a cored wire.

78. An electric arc welder as defined in claim 77 including a timer to set the period of said pulses of said pulse welding process.

79. An electric arc welder as defined in claim 77 wherein said boost circuit creates a controlled, background current segment following said plasma boost pulse.

80. An electric arc welder as defined in claim 79 including a timer to set the period of said pulse of said pulse welding process and a circuit responsive to the end of the background segment to reset said timer.

81. An electric arc welder as defined in claim 79 including a circuit to sense said arc voltage during said plasma boost pulse and a circuit to adjust said background segment based upon said sensed arc voltage.

82. An electric arc welder as defined in claim 77 wherein said voltage is less than 25 volts.

83. An electric arc welder as defined in claim 77 wherein the arc length is less than 0.30 inches.

84. An electric arc welder as defined in claim 77 wherein said cored wire is a metal cored wire with an effective amount of sulfur in the core.

85. An electric arc welder as defined in claim 84 wherein said sulfur is in the range of 0.010 to 0.030 percent by weight of the electrode.

86. An electric arc welder as defined in claim 77 wherein said pulse welding process includes a succession of waveforms and said waveforms are created by a series of short current pulses generated at a frequency greater than 18 kHz and with a profile controlled by a waveform generator.

87. An electric arc welder as defined in claim 86 including an interrupt circuit to interrupt said waveform upon occurrence of a short circuit between said electrode and said workpiece.

88. An electric arc welder as defined in claim 87 wherein a waveform profile of a plasma boost pulse is processed by said welder during said interrupt.

89. An electric arc welder as defined in claim 1 wherein said plasma boost pulse is by regulation of arc current.

90. An electric arc welder as defined in claim 1 wherein said plasma boost pulse is by regulation of arc voltage.

91. An electric arc welder as defined in claim 1 wherein said plasma boost pulse is by regulation of arc power.

92. An electric arc welder as defined in claim 1 wherein said plasma boost pulse is regulated by a slope output characteristic.

93. An electric arc welder as defined in claim 1 including a timer to set the period of said pulses of said pulse welding process.

94. An electric arc welder as defined in claim 1 wherein said boost circuit creates a controlled, background current segment following said plasma boost pulse.

95. An electric arc welder as defined in claim 94 including a timer to set the period of said pulse of said pulse welding process and a circuit responsive to the end of the background segment to reset said timer.

96. An electric arc welder as defined in claim 94 including a circuit to sense said arc voltage during said plasma boost pulse and a circuit to adjust said background segment based upon said sensed arc voltage.

97. An electric arc welder as defined in claim 1 wherein said voltage is less than 25 volts.

98. An electric arc welder as defined in claim 97 wherein said pulse welding process includes a succession of waveforms and said waveforms are created by a series of short current pulses generated at a frequency greater than 18 kHz and with a profile controlled by a waveform generator.

99. An electric arc welder as defined in claim 98 including an interrupt circuit to interrupt said waveform upon occurrence of a short circuit between said electrode and said workpiece.

100. An electric arc welder as defined in claim 99 wherein a waveform profile of a plasma boost pulse is processed by said welder during said interrupt.

101. An electric arc welder as defined in claim 1 wherein the arc length is less than 0.30 inches.

102. An electric arc welder as defined in claim 1 wherein said pulse welding process includes a succession of waveforms and said waveforms are created by a series of short current pulses generated at a frequency greater than 18 kHz and with a profile controlled by a waveform generator.

103. An electric arc welder as defined in claim 102 including an interrupt circuit to interrupt said waveform upon occurrence of a short circuit between said electrode and said workpiece.

104. An electric arc welder as defined in claim 103 wherein a waveform profile of a plasma boost pulse is processed by said welder during said interrupt.

105. An electric arc welder as defined in claim 1 wherein said plasma boost pulse has a duration of 0.1-5.0 ms.

106. An electric arc welder as defined in claim 1 wherein said plasma boost pulse has a duration of less than about 1.0 ms.

107. An electric arc welder as defined in claim 1 wherein said plasma boost pulse has a duration of 0.2-0.5 ms.

108. An electric arc welder as defined in claim 1 wherein said plasma boost pulse has a regulated power of about 1-20 KW.

109. An electric arc welder as defined in claim 108 wherein said plasma boost pulse has a duration of 0.2-5.0 ms.

110. An electric arc welder as defined in claim 1 wherein said plasma boost pulse has a regulated power of about 11-15 KW.

111. An electric arc welder as defined in claim 110 wherein said plasma boost pulse has a duration of 0.2-0.5 ms.

112. A method of pulse welding by a series of pulses between an advancing electrode and a workpiece in a pulse welding process including a series of successive waveforms each having a pulse defined by a peak current beginning when the electrode is separated from the workpiece and a background current portion, said method comprising:
(a) detecting a short circuit between said electrode and said workpiece;
(b) clearing said short circuit; and,
(c) creating a plasma boost pulse after said short circuit has been cleared.

113. A method as defined in claim 112 wherein said plasma boost pulse has a regulated power in the general range of 5-20 KW.

114. A method as defined in claim 113 wherein said plasma boost pulse has a duration of 0.2 to 5.0 ms.

115. A method as defined in claim 114 wherein said electrode is a cored wire.

116. A method as defined in claim 114 including creating a controlled background current segment following said plasma boost pulses.

117. A method as defined in claim 113 wherein said electrode is a cored wire.

118. A method as defined in claim 117 wherein said plasma boost pulse is regulated arc current.

119. A method as defined in claim 113 including creating a controlled background current segment following said plasma boost pulses.

120. A method as defined in claim 113 including creating a controlled background current segment following said plasma boost pulses.

121. A method as defined in claim 112 wherein said plasma boost pulse has a duration of 0.2 to 5.0 ms.

122. A method as defined in claim 121 wherein said electrode is a cored wire.

123. A method as defined in claim 122 wherein said plasma boost pulse is regulated arc current.

124. A method as defined in claim 121 including creating a controlled background current segment following said plasma boost pulses.

125. A method as defined in claim 112 wherein said electrode is a cored wire.

126. A method as defined in claim 125 wherein said plasma boost pulse is regulated arc current.

127. A method as defined in claim 112 wherein said plasma boost pulse is regulated arc current.

128. A method as defined in claim 112 including creating a controlled background current segment following said plasma boost pulses.

129. A method as defined in claim 112 including creating a controlled background current segment following said plasma boost pulses.

130. An electric arc welder for performing a pulse welding process by a current between an advancing electrode and a workpiece, said pulse welding process including a series of successive waveforms each having a pulse defined by a peak current beginning when the electrode is separated from the workpiece and a background current portion, said welder having an output voltage and comprising: a short detecting circuit creating a short signal upon occurrence of a short circuit between said advancing electrode and said workpiece, a circuit to increase said current after said signal to clear said short circuit and wherein said electrode is a cored wire; further comprising a boost circuit to create a plasma boost pulse after the short circuit has been cleared.

131. An electric arc welder as defined in claim 130 wherein said voltage is less than 25 volts.

132. An electric arc welder as defined in claim 131 wherein said voltage is in the general range of 17-22 volts.

133. An electric arc welder as defined in claim 132 wherein said cored wire is self shielding.

134. An electric arc welder as defined in claim 131 wherein said cored wire is self shielding.

135. An electric arc welder as defined in claim 130 wherein said cored wire is self shielding.

136. An electric arc welder for performing a pulse welding process by a current between an advancing electrode and a workpiece, said pulse welding process including a series of successive waveforms each having a pulse defined by a peak current beginning when the electrode is separated from the workpiece and a background current portion, said welder comprising: a short detecting circuit creating a short signal upon occurrence of a short circuit between said advancing electrode and said workpiece, a circuit for clearing the short circuit in response to the short signal, and a boost circuit to create a plasma boost pulse after the short circuit has been cleared.

137. An electric arc welder as defined in claim 136 including a circuit to increase said current after said signal and before said plasma boost pulse to break said short circuit.

138. An electric arc welder as defined in claim 137 including a premonition circuit to predict said break and a circuit to reduce said current and then activate said boost circuit when said break is predicted.

139. An electric arc welder as defined in claim 138 wherein said electrode is a cored wire.

140. An electric arc welder as defined in claim 139 wherein said cored wire is a metal cored electrode with an effective amount of sulfur in said core.

141. An electric arc welder as defined in claim 137 wherein said plasma boost pulse has a regulated power of 5-20 KW.

142. An electric arc welder as defined in claim 141 wherein said plasma boost pulse has a duration of 0.2-5.0 ms.

143. An electric arc welder as defined in claim 141 including a circuit to control said current increase into a first and second increase slope before said short breaks.

144. An electric arc welder as defined in claim 137 including a circuit to control said current increase into a first and second increase slope before said short breaks.

145. An electric arc welder as defined in claim 137 wherein said electrode is a cored wire.

146. An electric arc welder as defined in claim 145 wherein said cored wire is a metal cored electrode with an effective amount of sulfur in said core.

147. An electric arc welder as defined in claim 136 wherein said plasma boost pulse has a regulated power of 5-20 KW.

148. An electric arc welder as defined in claim 147 wherein said plasma boost pulse has a duration of 0.2-5.0 ms.

149. An electric arc welder as defined claim 147 including a circuit to control said current increase into a first and second increase slope before said short breaks.

150. An electric arc welder as defined in claim 136 wherein said electrode is a cored wire.

151. An electric arc welder as defined in claim 150 wherein said cored wire is a metal cored electrode with an effective amount of sulfur in said core.

152. A method of welding by a series of pulses between an advancing electrode and a workpiece in a pulse welding process including a series of successive waveforms each having a pulse defined by a peak current beginning when the electrode is separated from the workpiece and a background current portion, said method comprising:
    (a) creating a short signal upon occurrence of a short circuit between said advancing electrode and said workpieces;
    (b) increasing current after said signal to clear said short circuit; and,
    (c) creating a plasma boost pulse between said electrode and said workpiece after said short circuit has been cleared.

153. A method as defined in claim 152 wherein said plasma boost pulse has a regulated power of 5-20 KW.

154. A method as defined in claim 152 wherein said plasma boost pulse has a duration of 0.2-5.0 ms.

155. A method as defined in claim 152 wherein said current is increased after said signal and then decreased as said short circuit is being cleared.

156. A method as defined in claim 155 wherein said electrode is a cored wire.

157. A method as defined in claim 156 wherein said cored wire is a metal cored wire with an effective amount of sulfur in said core.

158. A method as defined in claim 152 wherein said electrode is a cored wire.

159. A method as defined in claim 158 wherein said cored wire is a metal cored wire with an effective amount of sulfur in said core.

160. An electric arc welder for performing a pulse welding process by a voltage driven current between an advancing electrode and a workpiece, said pulse welding process including a series of successive waveforms each having a pulse defined by a peak current beginning when the electrode is separated from the workpiece and a background current portion, said welder having an output voltage and comprising: a short detecting circuit creating a short signal upon occurrence of a short circuit between said advancing electrode and said workpiece, a circuit to increase said current after said signal, and a boost circuit to create a plasma boost pulse after said short circuit has been cleared.

161. An electric arc welder as defined in claim 160 wherein said plasma boost pulse has a regulated power of 5-20 KW.

162. An electric arc welder as defined in claim 160 wherein said plasma boost pulse has a duration of 0.2-5.0 ms.

163. An electric arc welder as defined in claim 160 wherein said electrode is a cored wire.

164. An electric arc welder as defined in claim 163 wherein said cored wire is a metal cored wire with an effective amount of sulfur in the core.

165. An electric arc welder as defined in claim 164 wherein said sulfur is in the range of 0.010 to 0.030 percent by weight of the electrode.

166. An electric arc welder as defined in claim 160 wherein said plasma boost pulse is by regulation of arc current.

167. An electric arc welder as defined in claim 160 wherein said plasma boost pulse is by regulation of arc voltage.

168. An electric arc welder as defined in claim 160 wherein said plasma boost pulse is by regulation of arc power.

169. An electric arc welder as defined in claim 160 wherein said boost circuit creates a controlled, background segment following said plasma boost pulse.

170. An electric arc welder as defined in claim 160 wherein said voltage is less than 25 volts.

171. An electric arc welder as defined in claim 160 wherein the arc length is less than 0.30 inches.

172. An electric arc welder as defined in claim 160 wherein said pulse welding process includes a succession of waveforms and said waveforms are created by a series of short current pulses generated at a frequency greater than 28 kHz and with a profile controlled by a waveform generator.

173. An electric arc welder for performing a pulse welding process by a voltage driven current between an advancing electrode and a workpiece, said pulse welding process including a series of successive waveforms each having a pulse defined by a peak current beginning when the electrode is separated from the workpiece and a background current portion, said welder having an output voltage and comprising: a short detecting circuit creating a first signal upon occurrence of a short circuit between said advancing electrode and said workpiece and a second signal when said short is cleared, a circuit for clearing the short circuit in response to said first signal, and a boost circuit to create a plasma boost pulse after creation of said second signal.

174. An electric arc welder as defined in claim 173 including a circuit to increase said current after said first signal and before said plasma boost pulse.

175. An electric arc welder as defined in claim 174 including a delay between a first sign of an activation of said circuit to increase said current.

176. An electric arc welder as defined in claim 174 wherein said plasma boost pulse has a regulated power of 5-20 KW.

177. An electric arc welder as defined in claim 174 wherein said plasma boost pulse has a duration of 0.2-5.0 ms.

178. An electric arc welder as defined in claim 173 wherein said plasma boost pulse has a regulated power of 5-20 KW.

179. An electric arc welder as defined in claim 173 wherein said plasma boost pulse has a duration of 0.2-5.0 ms.

180. An electric arc welder as defined in claim 173 wherein said plasma boost pulse is by regulation of arc voltage.

181. An electric arc welder as defined in claim 173 wherein said plasma boost pulse is by regulation of arc power.

182. An electric arc welder as defined in claim 173 wherein said plasma boost pulse is regulated by a slope output characteristic.

* * * * *